(12) United States Patent
Watanabe et al.

(10) Patent No.: US 7,215,607 B2
(45) Date of Patent: May 8, 2007

(54) OPTICAL DISC APPARATUS, CONTROL DEVICE AND CONTROL SIGNAL GENERATION CIRCUIT

(75) Inventors: Katsuya Watanabe, Nara (JP); Yuu Okada, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 504 days.

(21) Appl. No.: 10/659,392

(22) Filed: Sep. 11, 2003

(65) Prior Publication Data

US 2004/0071054 A1    Apr. 15, 2004

(30) Foreign Application Priority Data

Sep. 13, 2002    (JP)    ............... 2002-268536

(51) Int. Cl.
G11B 7/00    (2006.01)

(52) U.S. Cl. .................................. 369/44.29

(58) Field of Classification Search ............ 369/44.29, 369/44.35, 44.36
See application file for complete search history.

(56) References Cited

U.S. PATENT DOCUMENTS

| | | | |
|---|---|---|---|
| 5,629,911 A * | 5/1997 | Sasaki ..................... | 369/44.42 |
| 5,841,465 A * | 11/1998 | Fukunaga et al. ......... | 347/258 |
| 6,028,826 A * | 2/2000 | Yamamoto et al. ...... | 369/44.35 |
| 6,167,010 A | 12/2000 | Shimada et al. | |
| 6,195,319 B1 * | 2/2001 | Ohshita et al. .......... | 369/44.35 |
| 6,285,635 B1 * | 9/2001 | Watanabe et al. ......... | 369/44.27 |
| 6,353,203 B1 * | 3/2002 | Hokodate et al. ...... | 219/121.67 |
| 6,493,304 B2 * | 12/2002 | Watanabe et al. ......... | 369/53.22 |

FOREIGN PATENT DOCUMENTS

| | | | |
|---|---|---|---|
| JP | 5-151592 | | 6/1993 |
| JP | 05151590 A | * | 6/1993 |
| JP | 2000-331347 | | 11/2000 |
| TW | 407270 | | 10/2000 |

* cited by examiner

*Primary Examiner*—Wiliam Korzuch
*Assistant Examiner*—Christopher Lamb
(74) *Attorney, Agent, or Firm*—Wenderoth, Lind & Ponack, L.L.P.

(57) ABSTRACT

The optical disc apparatus comprises a convergence lens 12, a light detection device 14 for outputting a first and a second detection signals after detecting reflected optical beam area by area, an actuator 13 for shifting the convergence lens 12, a gain balance circuit 30 for changing a gain balance of the first and the second detection signals, an addition circuit 123 for outputting the addition signal AS after adding the first detection signal to the second detection signal in response to the shift in lens position and the change in gain balance made by the gain balance circuit 30 and the actuator 13, and an addition signal measurement unit 361 and a gain balance adjustment unit 362 operable to obtain the addition signal AS from the addition circuit 123, specify the gain balance that equalizes the detection sensitivities in the respective areas of the light detection device 14 based on the obtained result, and control the gain balance circuit 30 that realizes the determined gain balance.

32 Claims, 15 Drawing Sheets

OPTICAL DISC APPARATUS, CONTROL DEVICE AND CONTROL SIGNAL GENERATION CIRCUIT

BACKGROUND OF THE INVENTION (1) Field of the Invention

The present invention relates to a control signal generation circuit for generating a control signal needed to correctly record information on an optical disc using light of, for example, a laser, or correctly play back the information recorded on an optical disc, a control device for performing an optical control using a control signal, and an optical disc apparatus that is equipped with the control signal generation circuit and the control device, and records and plays back the information on an optical disc.

(2) Description of the Related Art

An optical disc apparatus for performing a tracking control has been conventionally proposed. (For example, refer to Japanese Laid-Open Patent application No. 5-151592.)

FIG. 1 is a block diagram showing the structure of the above-mentioned conventional optical disc apparatus.

The above-mentioned conventional optical disc apparatus adjusts gain balance according to the symmetry of a tracking error signal which will be mentioned later, and adjusts the lens position so as to reduce jitters to a minimum. The optical disc apparatus comprises an optical pick up 10, a control signal generation circuit 20, LPF 22 and 24, both of which consist of a lowpass filter, a digital signal processor 40 (called "DSP" from here), and a driving circuit 2.

The optical pick up 10 irradiates a converged optical beam 11 on a track of the information recording surface of an optical disc 1 and receives the reflection light. The optical pick up 10 comprises a laser radiation element (not shown as a figure) for outputting the optical beam 11, a convergence lens 12 for converging the optical beam 11, an actuator 13 for shifting the convergence lens 12 in the tracking direction, and a light detection device 14 for receiving and detecting the reflection light. The "tracking direction" used here means the direction for traversing the tracks on the information recording surface of the optical disc 1, that is, the diameter direction of the optical disc 1.

Also, the light receiving area of the light detection device 14 is divided into two in the tracking direction. A detection unit 14a corresponding to one of the areas divided into two detects inside of the reflection light (the inner radius of the optical disc 1), and a detection unit 14b corresponding to the other area detects outside of the reflection light (the outer radius of the optical disc 1). After that, the detection units 14a and 14b output the detected result respectively as a detection signal to the control signal generation circuit 20.

The control signal generation circuit 20 outputs a tracking error signal TE and an addition signal AS1 by performing a signal processing on the detected signals from the detection units 14a and 14b, and comprises a gain balance circuit 30, a subtraction circuit 21 and addition circuit 23.

The gain balance circuit 30 consists of a gain circuit 30a for amplifying the detection signal outputted from the detection unit 14a and a gain circuit 30b for amplifying the detection signal outputted from the detection unit 14b. Also, the gain balance circuit 30 increases or decreases respective gains of the gain circuits 30a and 30b independently based on the control from DSP40, and changes the gain balance of the detection signals from the detection units 14a and 14b. The gain balance used here indicates the ratio of the gain in the gain circuit 30a to the gain in the gain circuit 30b.

The subtraction circuit 21 calculates the output difference between the gain circuits 30a and 30b, and outputs the result as a tracking error signal TE.

The addition circuit 23 calculates the addition result of the detected signals from the detection units 14a and 14b, and outputs the result as an addition signal AS1.

The DSP 40 adjusts the gain balance of the gain balance circuit 30 of the control signal generation circuit 20 based on the tracking error signal TE outputted via LPF22 from the control signal generation circuit 20 and the addition signal AS1 outputted via LPF24 from the control signal generation circuit 20, adjusts the lens position of the convergence lens 12 of the optical pick up 10, and performs a tracking control.

This DSP 40 comprises A/D converters 41 and 51, an auto gain control unit 52 (called "AGC" from here), an offset adjustment unit 42, a gain adjustment unit 43, a tracking control unit 44, a symmetry detection unit 61, a balance adjustment unit 62, an amplitude detection unit 71, a lens position adjustment unit 72, a lens position setting unit 45 and a D/A converter 46.

The A/D converter 41 converts the tracking error signal TE from analog to digital and outputs the signal to the offset adjustment unit 42, while the A/D converter 51 converts the addition signal AS1 from analog to digital and outputs the signal to the AGC unit 52.

The offset adjustment unit 42 detects the offset factor which occurs in the circuit to the tracking error signal TE under the condition where no spot of reflection light is found by the light detection device 14, for example, when the laser radiation element is off or the focus of the convergence lens 12 is taken away from the information recording surface of the optical disc 1. The offset adjustment unit 42 also adds an offset appropriate to the factor to the tracking error signal TE, and outputs the addition result.

The AGC unit 52 specifies the gain of the tracking error signal TE according to the addition signal AS1 outputted from the A/D converter 51 to the gain adjustment unit 43.

The gain adjustment unit 43 adjusts the gain of the output from the offset adjustment unit 42 (the tracking error signal TE) according to the above-mentioned instruction from the AGC unit 52.

The tracking control unit 44, on obtaining the tracking error signal TE outputted from the gain adjustment unit 43, calculates the tracking driving value by filter operation for performing phase compensation or low frequency compensation, and outputs the tracking control signal showing the tracking driving value to the lens position setting unit 45.

The amplitude detection unit 71, on obtaining the tracking error signal TE outputted from the offset adjustment unit 42, detects the amplitude and outputs the detected result to the lens position adjustment unit 72.

The lens position adjustment unit 72 specifies the optimum lens position of the convergence lens 12 so that the reflection light that passes through the convergence lens 12 can be received by the detection units 14a and 14b evenly in space, and outputs, to the lens position setting unit 45, a lens position adjustment signal for adjusting the lens position of the convergence lens 12 to the determined lens position.

The lens position setting unit 45 adds the tracking control signal from the tracking control unit 44 to the lens position adjustment signal from the lens position adjustment unit 72 and outputs the addition result as the tracking driving signal to the D/A converter 46.

The D/A converter 46 converts the tracking driving signal from the lens position setting unit 45 from digital to analog and then outputs the signal to the driving circuit 2.

The symmetry detection unit 61, on obtaining the tracking error signal TE from the offset adjustment unit 42, detects the symmetry of the tracking error signal TE and outputs the result to the balance adjustment unit 62.

The balance adjustment unit 62, on obtaining the detected result of the symmetry detection unit 61, changes the gain balance of the gain balance circuit 30 to the optimum gain balance so as to equalizes the outputs from the gain circuits 30*a* and 30*b* when the detection units 14*a* and 14*b* receive the same amount of light based on the detected result.

The driving circuit 2, on obtaining the tracking driving signal outputted from the DSP 40, drives the actuator 13 of the optical pick up 10 by amplifying the current of the tracking driving signal and outputting the signal.

In this way, the convergence lens 12 of the optical pick up 10 is shifted in the tracking direction in a way that the spot of the optical beam 11 can follow the tracks of the optical disc 1 making the lens position determined by the lens position adjustment unit 72 the center.

The conventional optical disc apparatus like this adjusts the lens position of the convergence lens 12 to the optimum lens position (lens position adjustment) first, and adjusts the gain of the balance circuit 30 in the control signal generation circuit 20 to the above-mentioned optimum gain balance (gain balance adjustment). After the lens position adjustment and the gain balance adjustment are performed, the optical disc apparatus plays back the information recorded on the information recording surface of the optical disc 1 performing a tracking control.

Here, the above-mentioned lens position adjustment and gain balance adjustment will be explained in detail respectively.

As the convergence lens 12 deviates from the center position (the above-mentioned optimum lens position) of the light detection device 14 in the initial state, the spot of the reflection light forms an image deviating from the light detection device 14. A deviation of the lens position like this may occur because of the inclination of the optical axis of a lens triggered by the setting error of optical parts inside the optical disc apparatus or because of the self weight of the convergence lens 12 depending on the setting condition of the optical disc apparatus. For example, when the optical disc apparatus is vertically set (the optical disc apparatus is set in a way that the convergence lens 12 is set vertically), the convergence lens 12 hangs over in the vertical direction because of its self weight, and the convergence lens 12 shifts far away from the center position in the initial state.

Therefore, as to the lens position adjustment, the lens position of the convergence lens 12 is adjusted so as to equalize the spot sizes of reflection light received by the detection units 14*a* and 14*b* of the optical pick up 10.

More specifically, the lens position adjustment unit 72 of the DSP 40 shifts the convergence lens 12 in the tracking direction within the predetermined range, and obtains the results at the respective lens positions detected by the amplitude detection unit 71. The amplitude detection unit 71 of the DSP 40 calculates the difference (TEmax-TEmin) between the maximum level (TEmax) and the minimum level (TEmin) of the tracking error signal TE outputted from the offset adjustment unit 42 at the respective lens positions of the convergence lens 12, obtains the TE amplitude, and outputs this as the detected result to the lens position adjustment unit 72.

FIG. 2 is an illustration showing the tracking error signal TE and the TE amplitude when the convergence lens 12 is set at the predetermined lens position.

As shown in this FIG. 2, the amplitude detection unit 71 obtains the tracking error signal TE that repeatedly fluctuates as time passes, and obtains the TE amplitude from the difference between the maximum level (TEmax) and the minimum level (TEmin).

And, the lens position adjustment unit 72 specifies the lens position where the TE amplitude becomes maximum as the optimum position.

FIG. 3 is a diagram showing the relation between the lens position of the convergence lens 12 and the TE amplitude.

As shown in this FIG. 3, the TE amplitude changes depending on the lens position of the convergence lens 12, and the TE amplitude is the maximum value at the predetermined lens position.

The lens position adjustment unit 72 stores TE amplitudes at respective lens positions, for example, A, B, C, D, and E which are points shown in FIG. 3, specifies the lens position where the TE amplitude is maximum (the lens position shown as point D) as the above-mentioned optimum lens position, and outputs a lens position adjustment signal that makes it possible to shift the convergence lens 12 to the lens position.

Consequently, the driving circuit 2 that obtains the lens position adjustment signal like this through the lens position setting unit 45 and the D/A converter 46 drives the actuator 13 based on the lens position adjustment signal and shifts the convergence lens 12 to the determined lens position. In this way, the lens position adjustment is performed.

Next, the gain balance adjustment will be explained.

The detection sensitivities of detection units 14*a* and 14*b* of the light detection device 14 are rarely equal to each other for manufacturing reasons, in other words, they are usually different from each other. Therefore, when the gain balance adjustment is not performed, in other words, gains of the gain circuits 30*a* and 30*b* are made to be equal to each other, an offset is needed for the tracking error signal TE because of the output difference between the detection units 14*a* and 14*b*.

Therefore, the symmetry detection unit 61 and the balance adjustment unit 62 of the DSP 40 perform the gain balance adjustment so that the offset factor for the above-mentioned tracking error signal TE can be removed.

More specifically, the symmetry detection unit 61 adds the maximum level of the tracking error signal TE (TEmax) to the minimum level of the tracking error signal TE (TEmin), and outputs the addition result (TEmax+TEmin) to the balance adjustment unit 62. And, the balance adjustment unit 62 changes the gains of the gain circuits 30*a* and 30*b* of the gain balance circuit 30 so that the addition result by the symmetry detection unit 61 becomes "0", in other words, the tracking error signal TE has a wave form symmetrical in the positive and negative directions, and adjusts the gain balance of the gain balance circuit 30. In this way, the gain balance adjustment is performed.

A series of operations of the above-mentioned conventional optical disc apparatus like this will be explained with reference to FIG. 4.

FIG. 4 is a flow chart showing the operation of the above-mentioned conventional optical disc apparatus.

First, the lens position adjustment unit 72 drives the actuator 13 by controlling the driving circuit 2 and sets the lens position of the convergence lens 12 at x1 (step S900).

Next, the amplitude detection unit 71 obtains the tracking error signal TE when the convergence lens 12 is set on the lens position x1 (step S902) and detects the TE amplitude w1 (step S904).

The lens position adjustment unit 72 sets lens positions of the convergence lens 12 at x2, x3, ... xn in order by controlling the driving circuit 2 and detects the TE amplitudes w2, w3, ... wn (steps S900~S906) by repeatedly executing the operations of the above-mentioned steps from S902 to S904 on the respective lens positions x2, x3, ... xn.

Next, the lens position adjustment unit 72 specifies, for example, the lens position x5 corresponding to the TE amplitude w5 with the maximum TE amplitude out of the detected TE amplitudes w1, w2, w3, ... wn as the optimum lens position (step S908) and outputs the lens position adjustment signal that makes the lens position of the convergence lens 12 x5. In this way, the driving circuit 2 drives the actuator 13 based on the lens position adjustment signal and adjusts the lens position of the convergence lens 12 to the determined lens position x5 (step S910).

A lens position adjustment is performed by the operation in the steps from S900 to S910.

The symmetry detection unit 61 and the balance adjustment unit 62 obtains the tracking error signal TE (step S912), detects the symmetry of the tracking error signal TE (step S914) and sets the gain balance of the gain balance circuit 30 at the optimum gain balance in a way that the difference between the maximum level of the tracking error signal TE (TEmax) and the minimum level of the tracking error signal TE (TEmin) becomes "0" (step S916).

The gain balance adjustment is performed by the operation in the steps from S912 to S916.

Next, when information reading or writing is performed on the optical disc 1, the tracking control unit 44 obtains the tracking error signal TE via the gain adjustment unit 43 and outputs the tracking control signal corresponding to the tracking error signal TE. In this way, the optical disc apparatus performs a tracking control that makes the beam spot of the optical beam 11 follow the tracks of the optical disc 1 (step S918).

In this way, the gain balance of the above-mentioned conventional optical disc apparatus needs to be pre-adjusted after the lens position adjustment is performed.

However, the gain balance of the above-mentioned conventional optical disc apparatus is not adjusted when the lens position adjustment is performed. Therefore, there is a case where the TE amplitude becomes big when the convergence lens 12 shifts to either of the detection unit 14a or 14b of the light detection device 14 with a bigger detection sensitivity, consequently, it becomes impossible to accurately perform a lens position adjustment. Also, even when the detection sensitivities of the respective detection units 14a and 14b are equal to each other at the time of performing a lens position adjustment, many errors are included in the TE amplitudes detected by finding the peak from the tracking error signal TE shown in FIG. 2, also, many errors are included in the lens positions specified from the relations between the TE amplitudes and lens positions shown in FIG. 3, thus it is impossible to accurately perform a lens position adjustment.

The above-mentioned conventional optical disc apparatus cannot accurately perform a lens position adjustment because it performs a tracking control under the condition where the lens position deviates from a right position, which brings a problem that it is impossible to realize a stable tracking control because of the lens position deviation.

Also, the above-mentioned conventional optical disc apparatus cannot accurately perform a gain balance adjustment either when it cannot accurately perform a lens position adjustment mentioned above because it adjusts the gain balance under the condition where the lens position is adjusted.

In other words, the above-mentioned conventional optical disc apparatus performs a tracking control under the condition where the gain balance deviates because it cannot accurately perform the gain balance adjustment, which brings a problem that it cannot realize a stable tracking control because of the gain balance deviation.

Further, in the above-mentioned conventional optical disc apparatus, the addition signal AS1 is the addition result of the detected signals outputted from the detection units 14a and 14b. As the addition signal AS1 changes as the lens position of the convergence lens 12 shifts depending on the difference of sensitivities between the detection units 14a and 14b and the gain of the tracking error signal TE is changed according to the addition signal AS1, performing a tracking control that shifts the lens position further causes a problem of making the tracking control more unstable.

SUMMARY OF THE INVENTION

Therefore, the present invention is invented considering those problems and its purpose is to provide an optical disc apparatus whose reliability is improved by performing a stable tracking control, its control device and the control signal generation circuit.

In order to achieve its purpose, the optical disc apparatus concerning the present invention is for recording or playing back optical information on an optical disc, comprising: a convergence lens for converging an optical beam that is irradiated on the optical disc; a light detection unit operable to receive and detect the optical beam reflected by the optical disc on each divided area in a tracking direction, and output a first detection signal corresponding to a detected result from either one of the divided areas and a second detection signal corresponding to a detected result from the other divided area; a lens shifting unit operable to shift the light receiving area of the light detection unit in a tracking direction by shifting the convergence lens in the tracking direction; an amplifying unit operable to change a gain balance by amplifying the first and the second detection signals using independent gains respectively; an addition unit operable to output an addition signal by adding the first detection signal to the second detection signal in response to the shift in lens position of the convergence lens and the change in gain balance made by the lens shifting unit and the amplifying unit; and a gain balance adjustment unit operable to obtain the addition signal outputted from the addition unit, specify a gain balance that equalizes detection sensitivities of the respective areas in the light detection unit based on the obtained result, and control the amplifying unit so as to have the amplifying unit amplify the first and the second detection signals using the determined gain balance. For example, the gain balance adjustment unit specifies a predetermined gain balance as a gain balance that equalizes detection sensitivities of the respective areas in the light detection unit in the case where an addition signal becomes constant when a lens position shifts in the predetermined gain balance.

In this way, as a gain balance that equalizes detection sensitivities in the respective areas in the light detection unit is specified out of addition signals in response to the shift in lens position and the change in gain balance, and the gain balance of the first and the second detection signals is adjusted to the determined gain balance, it becomes possible to adjust the gain balance to the optimum gain balance irrespective of the adjusted result of the lens position, consequently, it becomes possible to stabilize the tracking control using the first and the second detection signals and improve the reliability.

The lens shifting unit shifts the convergence lens to the first and the second lens positions here. The gain balance adjustment unit may show the relation between the gain balance and the addition signal at the first lens position with function approximation, show the relation between the gain balance and the addition signal at the second lens position with function approximation and specify the gain balance shown as the intersection of both functions as the gain balance that equalizes the detection sensitivities in the respective areas in the light detection unit.

In this way, it becomes possible to specify the optimum gain balance by only changing the lens position of the convergence lens to these two points of the first and the second lens positions, thus it becomes easy to specify the optimum gain balance.

Also, the optical disc apparatus, further comprising: a lens position adjustment unit operable to obtain the addition signal outputted from the addition unit, specify a lens position that equalizes sizes of the respective areas for receiving optical beam in the light detection unit based on an obtained result, and control the lens shifting unit so that the convergence lens shifts to the determined lens position.

For example, the lens position adjustment unit specifies the predetermined lens position as the lens position that equalizes the sizes of the respective areas for receiving the optical beam in the light detection unit in the case where the addition signal the gain balance changes at determined lens positions. In other words, the lens position adjustment unit specifies the predetermined lens position as the lens position that equalizes the sizes of the respective areas for receiving the optical beam in the light detection unit when the change rate of the addition signal on the gain balance is "0" at the predetermined lens position.

In this way, as a lens position that makes the sizes of the respective areas for receiving the optical beam in the light detection unit is specified from the addition signal in response to the shift in lens position and the change in gain balance, and the lens position of the convergence lens is adjusted to the determined lens position, it is possible to accurately adjust to the optimum lens position preventing many errors in determining the lens position from being included, consequently, it becomes possible to stabilize a tracking control using the first and the second detection signals and further improve the reliability.

In this way, the amplifying unit changes the gain balance to the first and the second gain balances. The lens position adjustment unit may show the relation between the lens position and the addition signal at the first gain balance with function approximation, show the relation between lens position and the addition signal at the second gain balance with function approximation and specify the lens position shown as the intersection of both functions as the lens position that equalizes the sizes of the respective areas for receiving the optical beam in the light detection unit.

In this way, it is possible to specify the optimum lens position by only changing the gain balance to these two points of the first and the second gain balances, thus it becomes easy to specify the optimum lens position.

Also, the optical disc apparatus, further comprising: a subtraction unit operable to output a subtraction signal by calculating the difference between the first detection signal and the second detection signal whose gain balance is adjusted by the gain balance adjustment unit; a subtraction signal amplifying unit operable to amplify the subtraction signal; a gain adjustment unit operable to change the gain of the subtraction signal amplifying unit in response to the addition signal outputted from the addition unit; and a tracking control unit operable to control the lens shifting unit so that optical beam can follow the tracks of the optical disc based on the subtraction signal amplified by the subtraction signal amplifying unit.

In this way, it is possible to perform a tracking control reducing the influence of the reflection rate of the optical beam to the optical disc because the tracking control is performed based on the subtraction signal amplified according to the addition signal and it is also possible to further stabilize the tracking control without allowing the gain of the subtraction signal amplifying unit to fluctuate in response to the shift in lens position because the addition signal is based on the first and the second detection signals whose gain balance is adjusted to the optimum one.

Also, the optical disc apparatus, further comprising: a subtraction unit operable to output a subtraction signal by calculating a difference between the first detection signal and the second detection signal whose gain balance is adjusted by the gain balance adjustment unit; and a lens position adjustment unit operable to specify a lens position that equalizes sizes of the respective areas for receiving optical beam in the light detection unit based on the subtraction signal outputted from the subtraction unit, and control the lens shifting unit so that the convergence lens shifts to the determined lens position.

In this case, it is possible to accurately adjust the lens position to the optimum preventing a lot of errors in specifying lens positions from being included because the optimum lens position is specified from the subtraction signal using the result of the gain balance adjustment.

Also, the optical disc apparatus concerning the present invention an optical disc apparatus for recording or playing back optical information on an optical disc, comprising: a convergence lens for converging optical beam that is irradiated on the optical disc; a light detection unit operable to receive and detect the optical beam reflected by the optical disc on each divided area in a tracking direction, and output a first detection signal corresponding to a detected result from either one of the divided areas and a second detection signal corresponding to a detected result from the other divided area; a lens shifting unit operable to shift a light receiving area in the light detection unit in a tracking direction by shifting the convergence lens in the tracking direction; an amplifying unit operable to change a gain balance by amplifying the first and the second detection signals using independent gains respectively; an addition unit operable to output an addition signal by adding the first detection signal to the second detection signal in response to the shift in lens position of the convergence lens and the change in gain balance made by the lens shifting unit and the amplifying unit; and a lens position adjustment unit operable to obtain the addition signal outputted from the addition unit, specify a lens position that equalizes sizes of the respective areas in the light detection unit for receiving optical beam based on an obtained result, and control the lens shifting unit so that the convergence lens shifts to the determined lens position.

For example, the lens position adjustment unit specifies the lens position that equalizes the sizes of the areas for receiving the optical beam in the respective areas in the light detection unit when the addition signal becomes constant in the case where the gain balance changes in the predetermined lens position.

In this way, as the lens position that equalizes the sizes of the respective areas for receiving the optical beam in the light detection unit is specified from the addition signal in response to the shift in lens position and the change in gain balance and the lens position of the convergence lens is adjusted to the determined lens position, it is possible to accurately adjust to the optimum lens position irrespective of the result of the gain balance adjustment, consequently, it becomes possible to stabilize a tracking control using the first and the second detection signals and improve the reliability.

Further, the present invention can be realized as a control device for controlling the optical head of the optical disc apparatus, its control method, or a control signal generation circuit for generating the control signal for controlling the optical head of the optical disc apparatus.

FURTHER INFORMATION ABOUT TECHNICAL BACKGROUND TO THIS APPLICATION filed, is incorporated herein by reference.

Japanese Patent application No. 2002-268536 filed Sep. 13, 2002.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

(First Embodiment)

The optical disc apparatus in the first embodiment of the present invention will be explained below with reference to figures.

Figure 1:
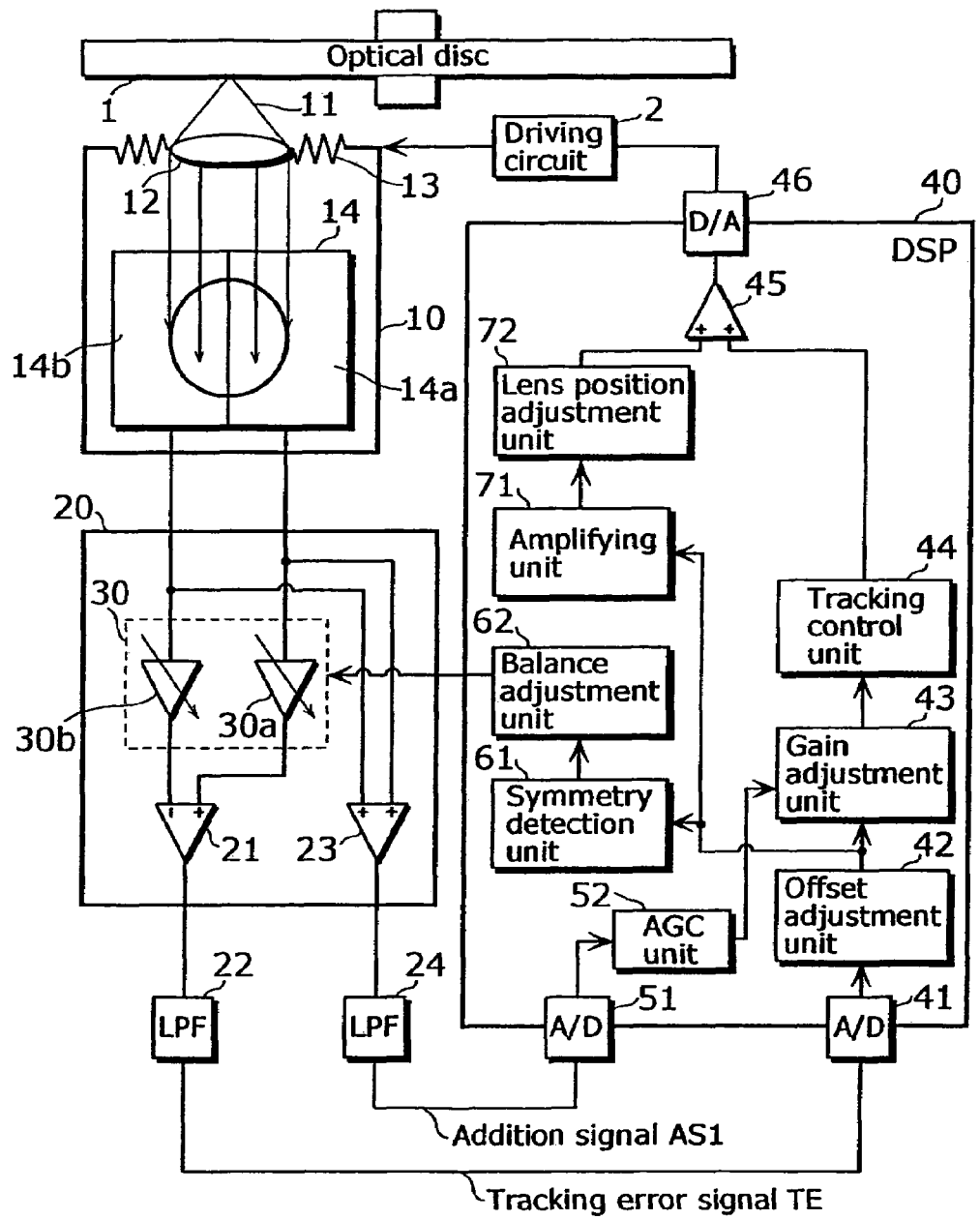
FIG. 1 is a block diagram showing the structure of the optical disc apparatus in the background art.
Figure 2:
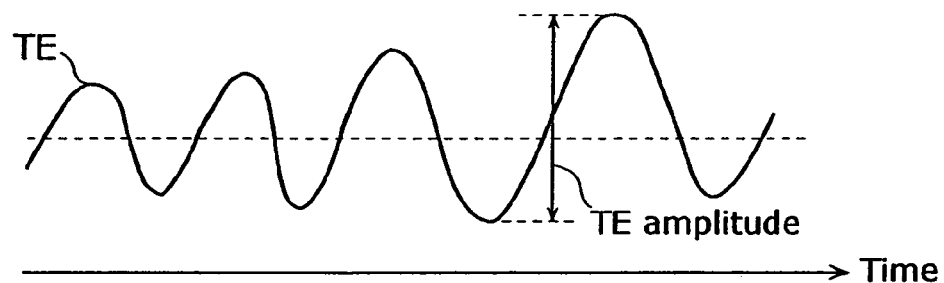
FIG. 2 is an illustration showing a tracking error signal and its TE amplitude in the case where the convergence lens in the background art is set at the determined lens position.
Figure 3:
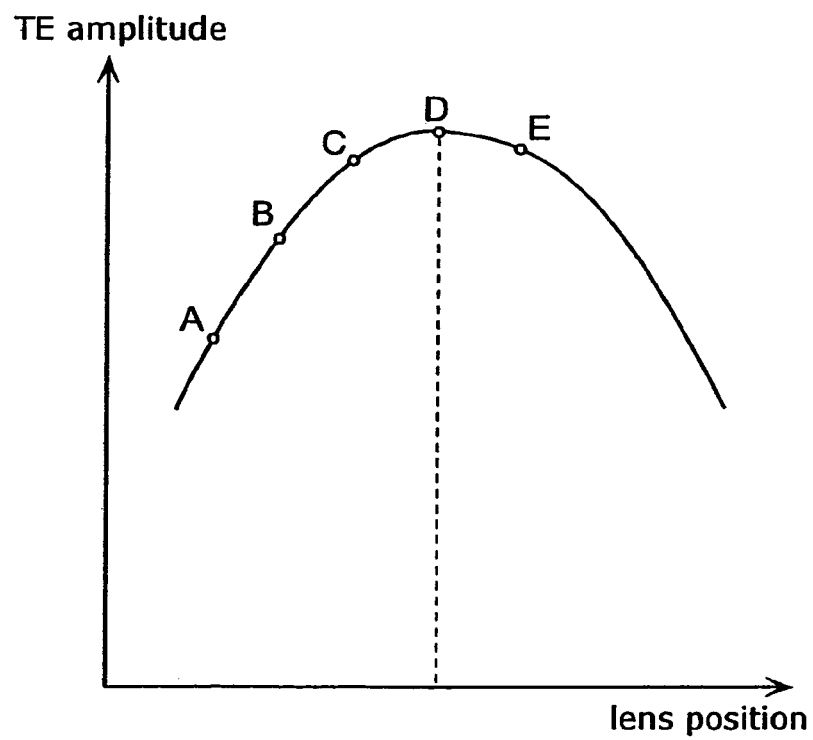
FIG. 3 is a diagram showing the relation between a lens position and a TE amplitude of the convergence lens.
Figure 4:
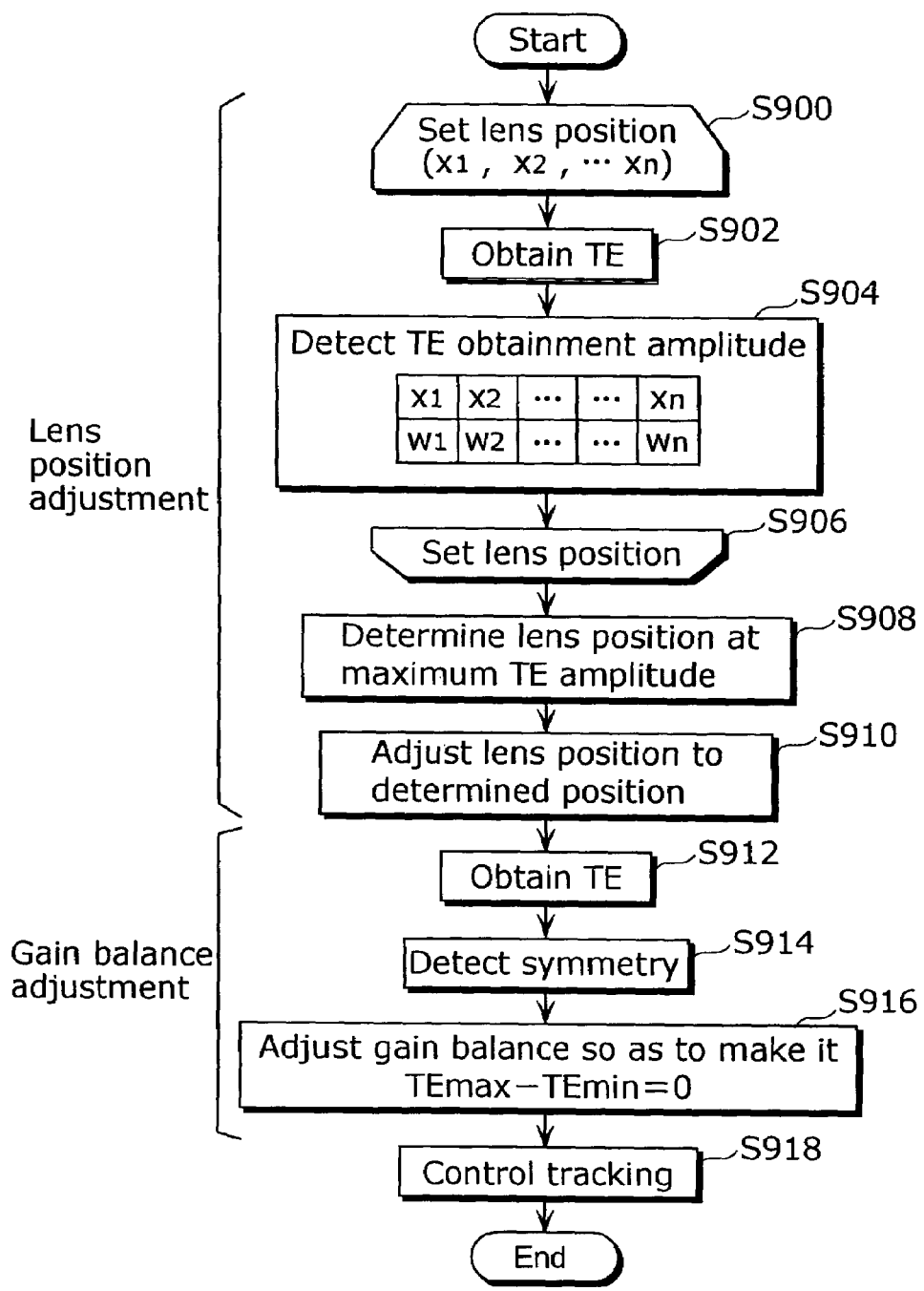
FIG. 4 is a flow chart showing the operation of the optical disc apparatus in the background art.
Figure 5:
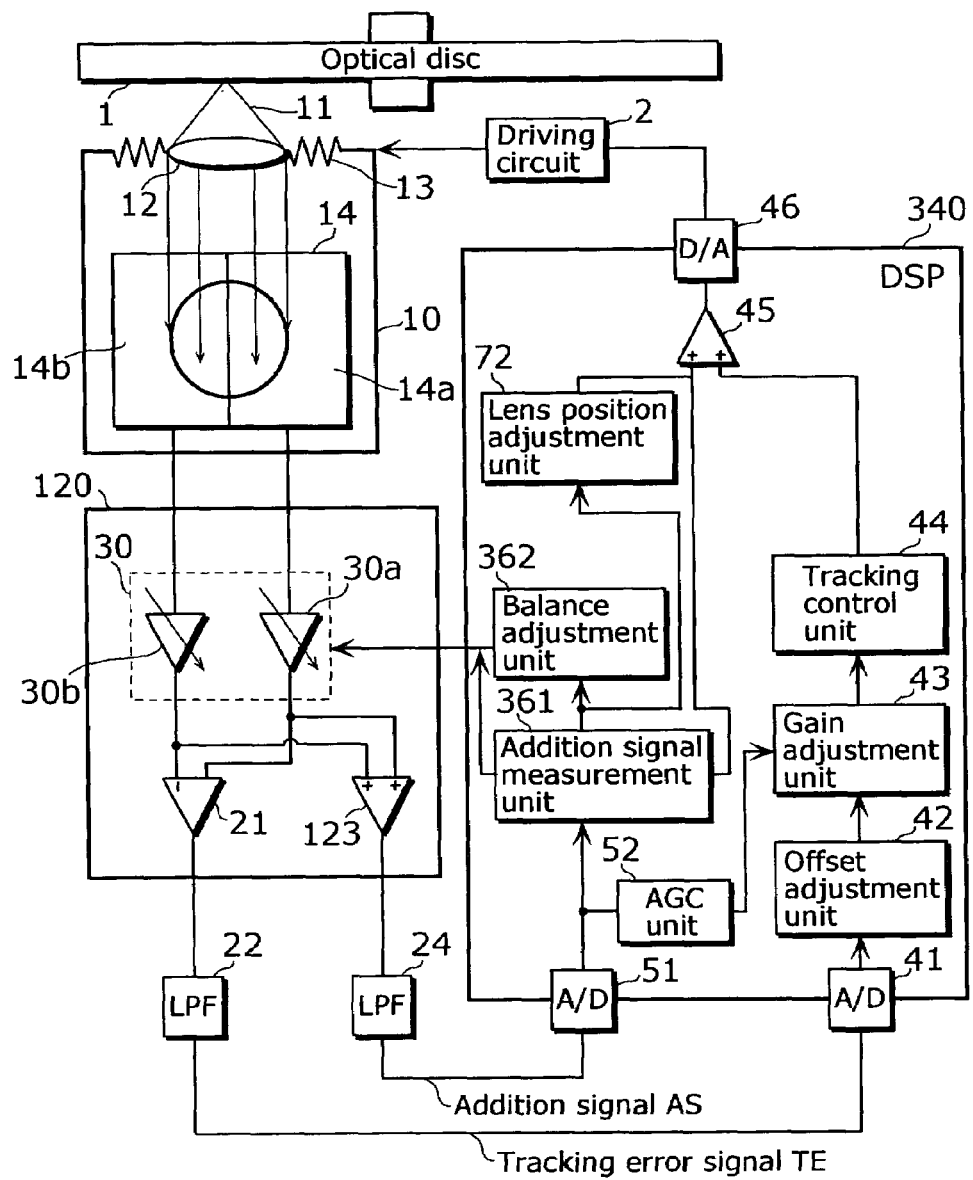
FIG. 5 is a block diagram showing the structure of the optical disc apparatus in a first embodiment of the present invention.

FIG. 5 is a block diagram showing the structure of the optical disc apparatus in the first embodiment of the present invention.

The optical disc apparatus in this embodiment is capable of performing a lens position adjustment and a gain balance adjustment accurately, and it comprises a light pick up 10, a control signal generation circuit 120, LPF 22 and 24, both of which consist of, a lowpass filter, a digital signal processor 340 (called "DSP" from here) and a driving circuit 2.

The optical pick up 10 irradiates an optical beam 11 converged on a track of the information recording surface of an optical disc 1 and receives the reflection light. The optical pick up 10 comprises a laser radiation element (not shown as a figure) for outputting the optical beam 11, a convergence lens 12 for converging the above-mentioned optical beam 11, an actuator 13 for shifting the convergence lens 12 in the tracking direction, and a light detection device 14 for receiving and detecting the reflection light.

Here, the light receiving area in the light detection device 14 is divided into two in the tracking direction. A detection unit 14a corresponding to one of the areas divided into two detects inside of the reflection light (the inner radius of the optical disc 1), and a detection unit 14b corresponding to the other area detects outside of the reflection light (the outer radius of the optical disc 1). After that, the detection units 14a and 14b output the detected result respectively as a detection signal to the control signal generation circuit 120.

The control signal generation circuit 120 outputs a tracking error signal TE and an addition signal AS by performing the signal processing on the detected signal from the detection units 14a and 14b, and it comprises a gain balance circuit 30, a subtraction circuit 21 and an addition circuit 123.

The gain balance circuit 30 consists of a gain circuit 30a for amplifying the detected signal outputted from the detection unit 14a and a gain circuit 30b for amplifying the detected signal outputted from the detection unit 14b. The gain balance circuit 30 independently increases or decreases the respective gains of the gain circuits 30a and 30b by control from the DSP 340 and changes the gain balance of the detected signals from the detection units 14a and 14b.

The subtraction circuit 21 calculates the output difference between the gain circuits 30a and 30b, and outputs the result as a tracking error signal TE.

The addition circuit 123 in this embodiment does not add the detected signals directly outputted from the detection units 14a and 14b like in the background art, but adds the detection signals to be outputted from the gain circuits 30a and 30b and outputs the result as addition signal AS.

The DSP 340 adjusts the gain balance of the gain balance circuit 30 of the control signal generation circuit 120 based on the tracking error signal TE outputted from the control signal generation circuit 120 via LPF 22 and the addition signal AS outputted from the control signal generation circuit 120 via LPF 24, adjusts the lens position of the convergence lens 12 of the optical pick up 10, and performs a tracking control.

Also, the DSP 340 in this embodiment comprises A/D converters 41 and 51, an auto gain control 52 (called "AGC"

form here), an offset adjustment unit 42, a gain adjustment unit 43, a tracking control unit 44, an addition signal measurement unit 361, a balance adjustment unit 362, a lens position adjustment unit 372, a lens position setting unit 45 and a D/A converter 46.

The A/D converter 41 converts a tracking error signal TE from analog to digital and outputs the signal to the offset adjustment unit 42, and the A/D converter 51 converts an addition signal AS from analog to digital and outputs the signal to the AGC unit 52 and the addition signal measurement unit 361.

The offset adjustment unit 42 detects the factor of the offset which occurs in the circuit to the tracking error signal TE under the condition where no spot of reflection light is found in the light detection device 14, for example, when the laser radiation element is off or the focus of the convergence lens 12 is taken away from the information recording surface of the optical disc 1. The offset adjustment unit 42 also adds an offset appropriate to the factor to the tracking error signal TE, and outputs the addition result.

The gain adjustment unit 43 adjusts the gain to the output from the offset adjustment unit 42 (tracking error signal TE) in response to the control from the AGC unit 52.

The AGC unit 52 controls the gain adjustment unit 43 and makes the gain to the tracking error signal TE the gain in accordance with the addition signal AS outputted from the A/D converter 51.

In other words, the amplitude of the tracking error signal TE changes in response to the reflection rate when the gain of the gain adjustment unit 43 remains constant because the reflection rate of the optical beam 11 varies depending on positions on the information recording surface of the optical disc 1, but the AGC unit 52 changes the gain of the gain adjustment unit 43 so as to absorb changes of the amplitude of the tracking error signal TE.

More specifically, the AGC unit 52 detects changes in reflection rate by calculating the ratio of the addition signal AS to the standard level and changes the gain of the gain adjustment unit 43 in order not to allow the amplitude of the tracking error signal TE to fluctuate in response to changes of the reflection rate.

The tracking control unit 44, on obtaining the tracking error signal TE outputted from the gain adjustment unit 43, calculates the tracking driving value by filter operation for performing phase compensation or low frequency compensation based on the tracking error signal TE, and outputs the tracking control signal showing the tracking driving value to the lens position setting unit 45. The tracking control where the spot of the optical beam 11 follows the tracks of the optical disc 1 can be realized by using this tracking control signal.

Here, when the gain balance of the gain balance circuit 30 is adjusted to the optimum gain balance, the addition signal AS compared to the standard level in the AGC unit 52 remains constant even if the lens position of the convergence lens 12 changes by the tracking control.

As a result, the AGC unit 52 does not change the gain of the gain adjustment unit 43 in response to changes of the lens position of the convergence lens 12 in this embodiment, it is possible to realize a stable tracking control and provide a highly reliable optical disc apparatus.

The addition signal measurement unit 361 drives the actuator 13 by controlling the driving circuit 2 via the lens position setting unit 45 and the D/A converter 46, shifts the convergence lens 12 in the tracking direction and sets the convergence lens 12 at the several predetermined lens positions in order.

Further, the addition signal measurement unit 361 changes the gain ga of the gain circuit 30a and the gain gb of the gain circuit 30b in the gain balance circuit 30 to the several predetermined patterns, and changes the gain balance of the gain balance circuit 30.

Also, the addition signal measurement unit 361 obtains and stores the addition signal AS in the respective lens positions and the gain balances. For example, the addition signal measurement unit 361 changes the gain balance to ga1:gb1, ga2:gb2, ga3:gb3, . . . when the convergence lens 12 is set at the lens position x1, and obtains and stores the addition signals of AS1, AS2, AS3, . . . in the respective gain balances.

Also, the addition signal measurement unit 361 specifies the optimum lens position of the convergence lens 12 that substantially equalizes the sizes of the areas for receiving reflection light in the detection units 14a and 14b from the addition signal AS obtained as mentioned above, and specifies the gain balance of the optimum gain balance circuit 30 that equalizes the outputs from the gain circuits 30a and 30b when the detection units 14a and 14b receive the same amount of light. And, the addition signal measurement unit 361 instructs the determined lens position to the lens position adjustment unit 372 and also instructs the determined gain balance to the balance adjustment unit 362.

The lens position adjustment unit 372 outputs the lens position adjustment signal for adjusting the lens position of the convergence lens 12 to the lens position specified by the instruction when there is an instruction of the determined lens position from the addition signal measurement unit 361 as mentioned above.

The balance adjustment unit 362 adjusts the gain balance of the gain balance circuit 30 to the gain balance specified by the instruction when there is an instruction of the determined gain balance from the addition signal measurement unit 361 as mentioned above.

The lens position setting unit 45 adds the tracking control signal from the tracking control unit 44 to the lens position adjustment signal from the lens position adjustment unit 372, and outputs the addition result as the tracking driving signal to the D/A converter 46.

The D/A converter 46 converts the tracking driving signal from the lens position setting unit 45 from digital to analog, and outputs the signal to the driving circuit 2.

The driving circuit 2, on obtaining the tracking driving signal outputted from DSP 40, drives the actuator 13 of the optical pick up 10 in response to the tracking driving signal by amplifying the current of the tracking driving signal and outputting the signal.

In this way, the convergence lens 12 of the optical pick up 10 is shifted in the tracking direction in a way that the spot of the optical beam 11 can follow the tracks of the optical disc 1 making the lens position specified by a lens position adjustment signal outputted from the lens position adjustment unit 372 the center, that is, the lens position determined by the addition signal measurement unit 361 the center. In other words, the tracking control is realized.

Here, the operation for determining the gain balance and the lens position performed by the above-mentioned addition signal measurement unit 361 will be explained in detail with reference to FIG. 6 and FIG. 7.

Figure 6:
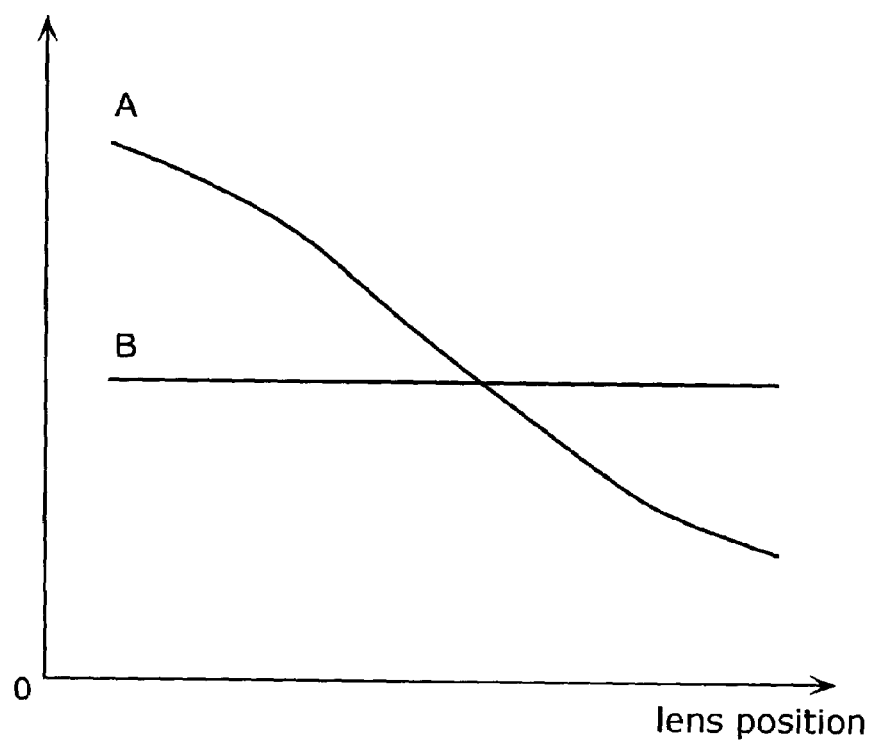
FIG. 6 is a diagram showing the relation between a lens position and an addition signal in the background art.

FIG. 6 is a diagram showing the relation between the lens position and the addition signal AS.

For example, when the gain balance circuit 30 is not set to the optimum gain balance (the gain balance that equalizes the outputs of the gain circuits 30a and 30b when the detection units 14a and 14b receive the same amount of light respectively) and the output from the gain circuit 30b is bigger than the output from the gain circuit 30a at the time when the detection units 14a and 14b receive the same amount of light respectively, the addition signal AS gradually decreases as shown by line A in FIG. 6 as the lens position of the convergence lens 12 changes from the detection unit 14b side to the detection unit 14a side (from left to right in FIG. 6) along the diameter direction of the optical disc 1.

However, when the gain balance of the gain balance circuit 30 is set at the optimum gain balance, the addition signal AS remains substantially constant as shown by line B in FIG. 6 even if the lens position of the convergence lens 12 changes along the diameter direction of the optical disc 1.

In other words, the addition signal measurement unit 361 in this embodiment finds the gain balance that keeps the addition signal AS constant even if the lens position changes out of the obtained results by obtaining the addition signal AS of the respective lens positions in the respective gain balances.

Figure 7:
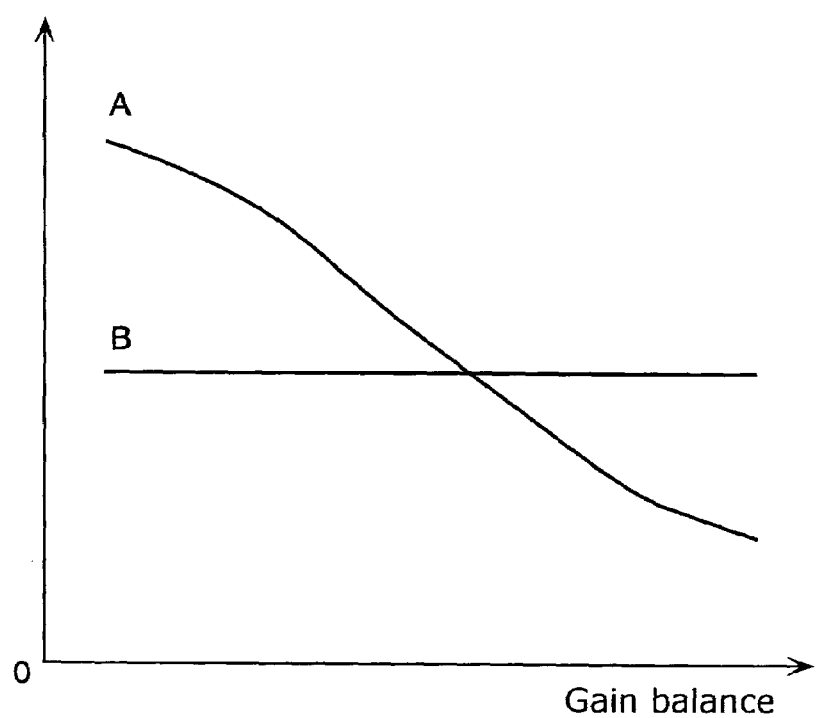
FIG. 7 is a diagram showing the relation between a gain balance and an addition signal in the background art.

FIG. 7 is a diagram showing the relation between the gain balance and the addition signal AS.

For example, when the convergence lens 12 is not set at the optimum lens position (the lens position that makes the sizes of the areas for receiving reflection light of the detection units 14a and 14b substantially constant) and the area for receiving reflection light of the detection unit 14b is bigger than the area for receiving reflection light of the detection unit 14a, the addition signal AS gradually decreases as shown by line A in FIG. 7 as the gain balance is increased. Here, the above-mentioned gain balance is represented as "Ga (1+g)/Gb (1−g)" (in this formula, 0<g<1) when the gain of the gain circuit 30a is Ga and the gain of the gain circuit 30b is Gb in the optimized gain balance.

However, when the convergence lens 12 is set at the optimum lens position, the addition signal AS keeps substantially constant as shown by line B in FIG. 7 even if the gain balance fluctuates.

In other words, the addition signal measurement unit 361 in this embodiment obtains the addition signal AS of the respective gain balances in the respective lens positions and finds the lens position that keeps the addition signal AS constant even if the gain balance changes out of the obtained results.

A series of operations of the optical disc apparatus like this in this embodiment will be explained with reference to FIG. 8~FIG. 10.

Figure 8:
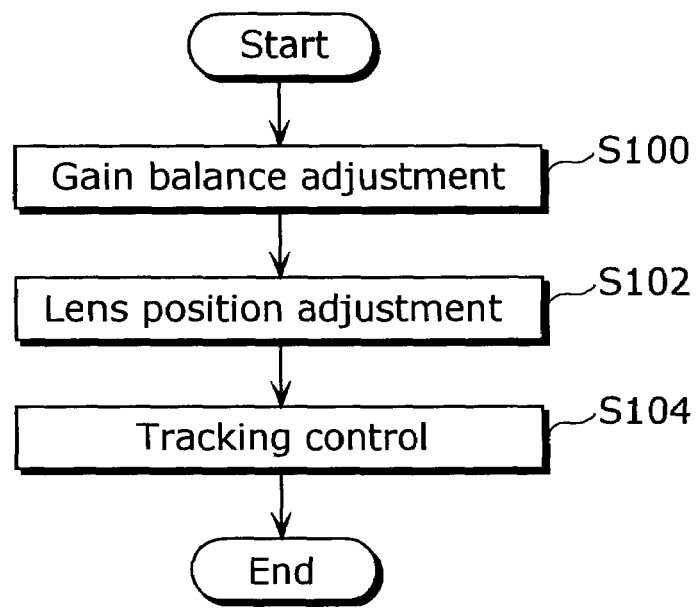
FIG. 8 is a flow chart showing the overall operation sequence of the optical disc apparatus in the background art.

FIG. 8 is a flow chart showing the overall operation sequence of the optical disc apparatus in this embodiment.

As shown in this FIG. 8, the optical disc apparatus in the embodiment adjusts the gain balance of the gain balance circuit 30 to the optimum gain balance first (step S100), and adjusts the lens position of the convergence lens 12 to the optimum lens position (step S102) after the gain balance adjustment is performed.

After the gain balance adjustment and the lens position adjustment are performed in this sequence, the optical disc apparatus obtains the tracking error signal TE like in the background art, and performs a tracking control that makes the beam spot of the optical beam 11 follow the tracks of the optical disc 1 (step S104).

Figure 9:
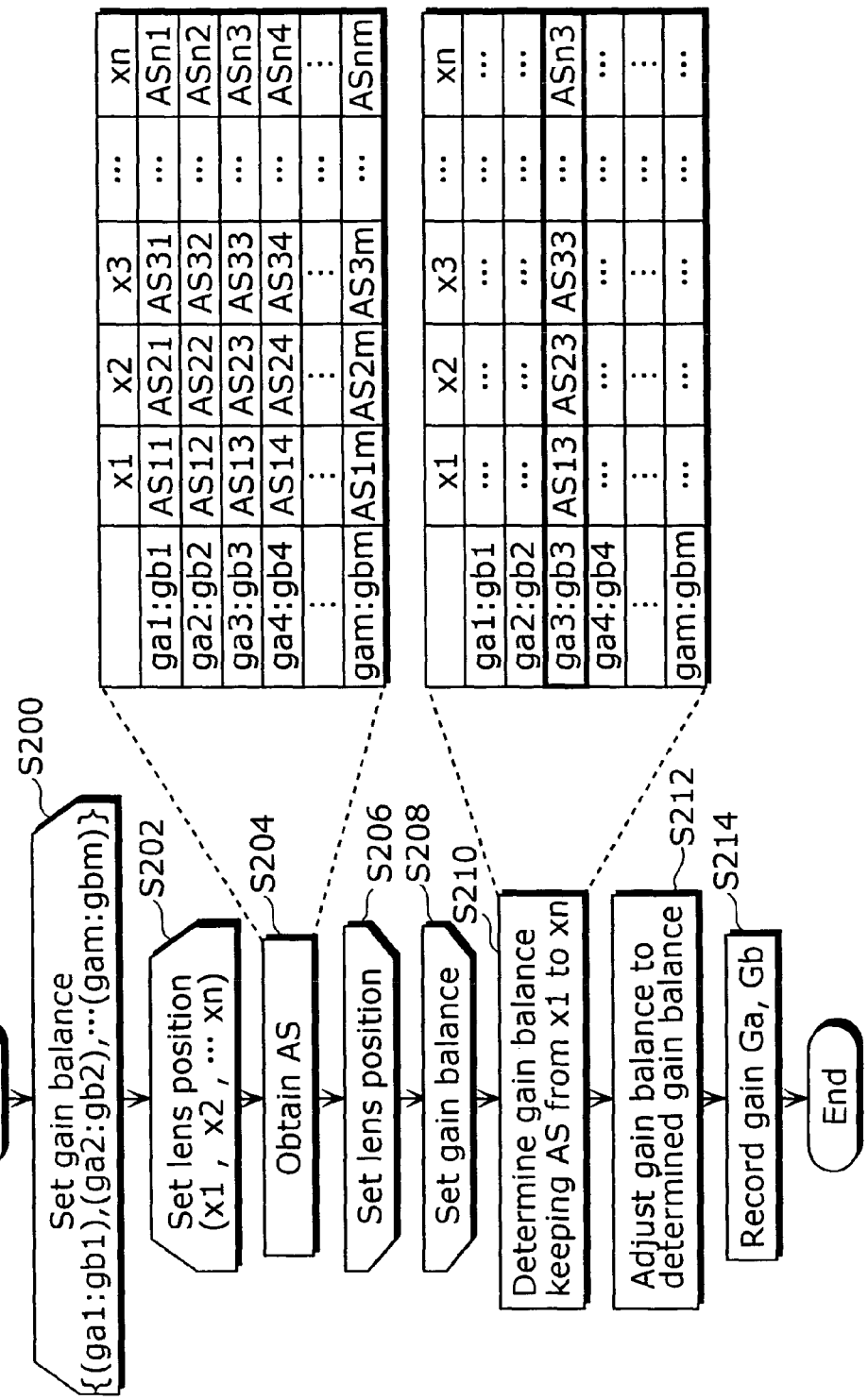
FIG. 9 is a flow chart showing the operation when the optical disc apparatus performs a gain balance in the background art.

FIG. 9 is a flow chart showing the operation for performing a gain balance adjustment by the optical disc apparatus in this embodiment.

First, the addition signal measurement unit 361 of the optical disc apparatus sets the gain balance of the gain balance circuit 30 to ga1:gb1 out of the predetermined gain balances (ga1:gb1, ga2:gb2, . . . gam:gbm) (step S200).

Next, the addition signal measurement unit 361 has the actuator 13 set the lens position of the convergence lens 12 to the lens position x1 out of the predetermined lens positions (x1, x2, . . . xn) (step S202) by controlling the driving circuit 2 via the lens position setting unit 45 and the D/A converter 46.

And, the addition signal measurement unit 361 obtains the addition signal AS (AS11) under the condition where the gain balance is ga1:gb1 and the lens position is x1 (step S204). After finishing the obtainment of the addition signal AS (AS11) like this, the addition signal measurement unit 361 changes the lens position of the convergence lens 12 to x2 and reobtains the addition signal AS (AS21), and likewise, it repeatedly executes the operation for obtaining the addition signal AS for all the remaining predetermined lens positions such as x3, . . . xn (step S202~S206). Consequently, addition signals AS11, AS21, . . . ASn1 are obtained.

After finishing the obtainment of the addition signal AS in the gain balance ga1:gb1 in this way, the addition signal measurement unit 361 changes the gain balance in the gain balance circuit 30 to ga2:gb2 (step S200), and obtains the addition signal AS corresponding to all the predetermined lens positions x1, x2, . . . xn in the gain balance ga2:gb2 as mentioned above (steps S202~S206). Further, the addition signal measurement unit 361 repeatedly executes the operation for obtaining the addition signal AS to the respective lens positions in the predetermined gain balance like this to all the remaining predetermined gain balances (ga3: gb3, . . . gam:gbm) (steps S200~S208). Consequently, addition signals AS12, AS22, ASn2, AS13, AS23, . . . ASn3 are obtained.

Next, the addition signal measurement unit 361 finds out the gain balance that makes the addition signal AS constant at the respective lens positions based on the above-mentioned obtained result, and specifies it as the optimum gain balance (step S210).

For example, the addition signal measurement unit 361 specifies gain balance ga3:gb3 as the optimum gain balance providing that gain balances of the addition signals AS13, AS23, . . . ASn3 are equal to each other irrespective of which lens position is employed out of x1, x2, . . . xn.

And, the addition signal measurement unit 361 instructs the above-mentioned determined gain balances to the balance adjustment unit 362 as mentioned above, and has the balance adjustment unit 362 adjust the gain balance of the gain balance circuit 30 to the determined gain balance (step S212). Further, the addition signal measurement unit 361 stores the gain Ga of the gain circuit 30a and the gain Gb of the gain circuit 30b when the gain balance of the gain balance circuit 30 is adjusted like this so as to adjust the lens position (step S214). In this way, gain balance adjustments are performed.

Figure 10:
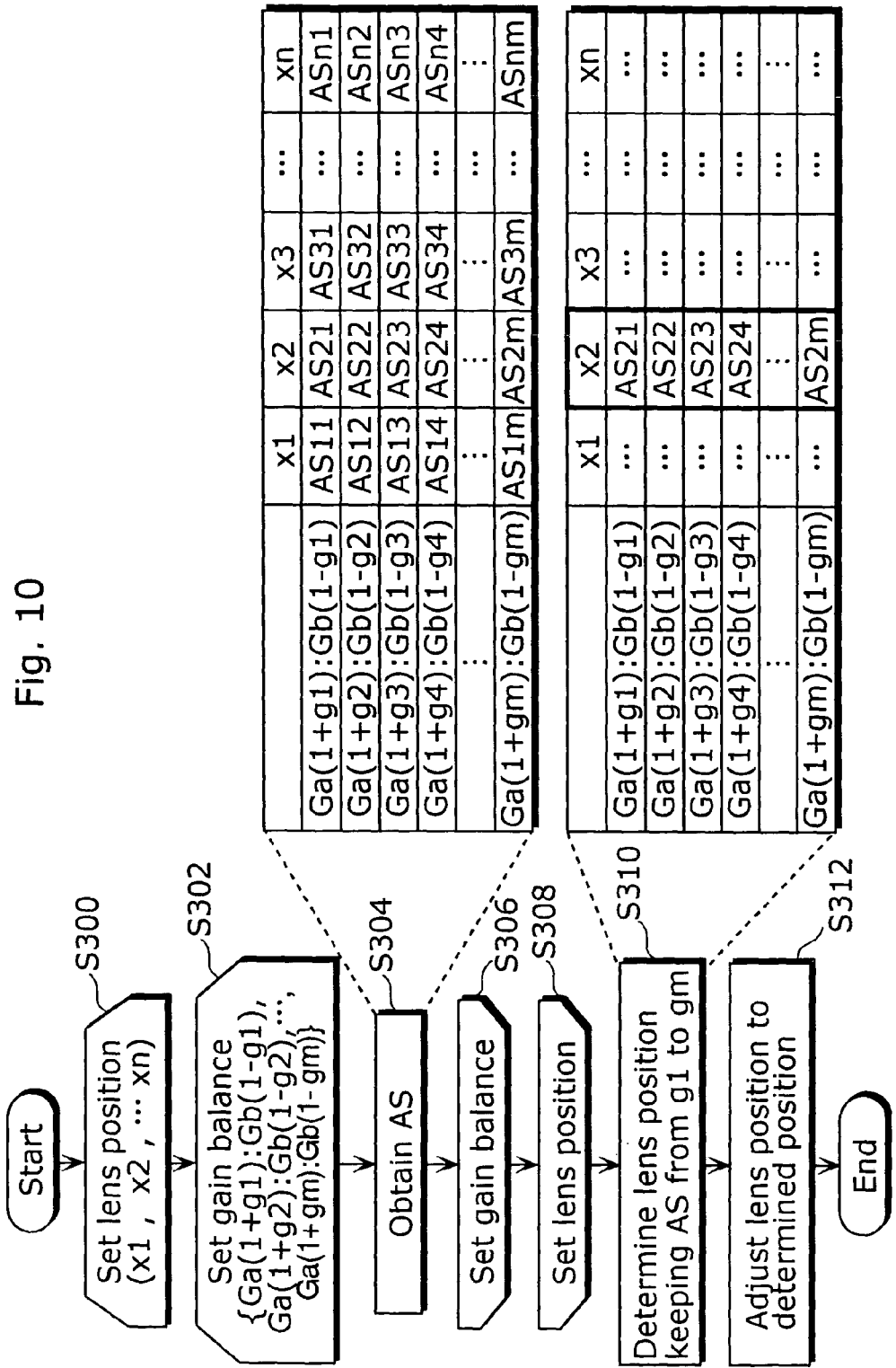
FIG. 10 is a flow chart showing the operation when the optical disc apparatus performs a lens position adjustment in the background art.

FIG. 10 is a flow chart showing the operation for a lens position adjustment performed by the optical disc apparatus in this embodiment.

First, the addition signal measurement unit 361 drives the actuator 13 by controlling the driving circuit 2 via the lens position setting unit 45 and the D/A converter 46, and sets the lens position of the convergence lens 12 at lens position x1 out of the predetermined lens positions (x1, x2, . . . xn)(step S300).

Next, the addition signal measurement unit 361 sets the gain balance so that the gain of the gain circuit 30a becomes Ga(1+g1) and the gain of the gain circuit 30b becomes Gb(1−g1) using the gain Ga of the gain circuit 30a and the gain Gb of the gain circuit 30b which are previously stored at the time of gain balance adjustments (step S302). Note that g1 is a number that satisfies "0<g1<1".

Also, the addition signal measurement unit 361 obtains the addition signal AS (AS11) under the condition where the lens position x1 is employed and the gain balance is Ga(1+g1):Gb(1−g1) (step S304). After finishing the obtainment of the addition signal AS (AS11) like this, the addition signal measurement unit 361 changes the gain balance so that the gain of the gain circuit 30a becomes Ga(1+g2) and the gain of the gain circuit 30b becomes Gb(1−g2) and reobtains the addition signal AS(AS12), and it repeatedly executes the operation for obtaining an addition signal AS for each of all the remaining predetermined gain balances, that is, gains such as {Ga(1+g3), Gb(1−g3)}, . . . {Ga(1+gm),Gb(1−gm)} in the gain circuits 30a and 30b (step S302~S306). Consequently, addition signals AS11, AS12, . . . AS1m are obtained. Note that g2, g3, . . . gm are different numbers that satisfy "0<g2, g3, . . . gm<1".

After obtaining the addition signal AS at the lens position x1 like this, the addition signal measurement unit 361 changes the lens position of the convergence lens 12 to x2 (step S300), and obtains the addition signal AS to all the predetermined gain balances at lens position x2 as mentioned above (steps S302~S306). Further, the addition signal measurement unit 361 repeatedly executes the operation for obtaining the addition signal AS to the respective gain balances at these predetermined lens positions to each of all the remaining predetermined lens positions (x3, . . . xn) (steps S300~S308). Consequently, addition signals AS21, AS22, . . . AS2m, AS31, AS32, . . . AS3m are obtained.

Next, the addition signal measurement unit 361 finds out the lens position that equalizes the addition signal AS in the respective gain balances based on the above-mentioned obtained result and specifies it as the optimum lens position (step S310).

For example, when addition signals AS21, AS22, . . . AS2m are equal to each other irrespective of which gain balance is found out of Ga(1+g1):Gb(1−gl), Ga(1+g2):Gb(1−g2), Ga(1+g3):Gb(1−g3), . . . {Ga(1+gm):Gb(1−gm)}, the addition signal measurement unit 361 specifies the lens position x2 as the optimum lens position. Also, as the value of the addition signal AS with an adjusted gain balance is grasped at the time of the gain balance adjustment, the addition signal measurement unit 361 specifies the lens position that keeps the value of the addition signal AS with an adjusted gain balance as the optimum lens position even if the gain balance changes.

Also, the addition signal measurement unit 361 instructs the determined lens position to the lens position adjustment unit 372 as mentioned above, and has the lens position adjustment unit 372 adjust the lens position of the convergence lens 12 to the determined lens position (step S312).

A lens position adjustment is performed by the operation from the above mentioned steps S300 to S312 in this embodiment.

As a gain balance adjustment is performed based on the addition signal AS in response to changes in gain balance and lens position like this in this embodiment, there is no need to previously perform a lens position adjustment like in the background art, in other words, it is possible to accurately perform a gain balance adjustment irrespective of the result of the lens position adjustment. Further, as the lens position adjustment is performed based on the addition signal AS in response to changes in gain balance and lens position in this embodiment, it is possible to reduce detection errors like in the background art and accurately perform a lens position adjustment. Consequently, it is possible to stabilize a tracking control and improve the reliability in this embodiment.

Also, the addition signal measurement unit 361 obtains the addition signal AS in the respective gain balances and the respective lens positions by changing the gain balance and the lens position, performs a gain balance adjustment from the obtained result, after that, reobtains the addition signal AS in the respective gain balances and the respective lens positions by changing the gain balance and the lens position and performs a lens position adjustment from the obtained result in this embodiment, but it is also possible to integrate these two kinds of operations for obtaining the addition signal AS into a single operation instead, and perform gain balance adjustments and lens position adjustments independently based on the result. In this case, the addition signal measurement unit 361 obtains the addition signal AS in the respective gain balances and the respective lens positions as mentioned above by appropriately changing the gain balance of the gain balance circuit 30 or the gains of the gain circuits 30a and 30b as a parameter, and specifies the gain balance that makes the addition signal AS become constant even if the lens position changes and the lens position that makes the addition signal AS become constant even if the gain balance changes by appropriately processing the obtained results. In this way, it is possible to easily specify the optimum gain balance and the optimum lens position by reducing the number of measurement times of the addition signal AS.

Also, an AGC unit 52 is equipped in this embodiment, but an optical disc apparatus can be equipped instead of the AGC unit 52. In this case, the optical disc apparatus can perform a gain balance adjustment and a lens position adjustment accurately, and thus the reliability of the optical disc apparatus can be improved.

Figure 11:
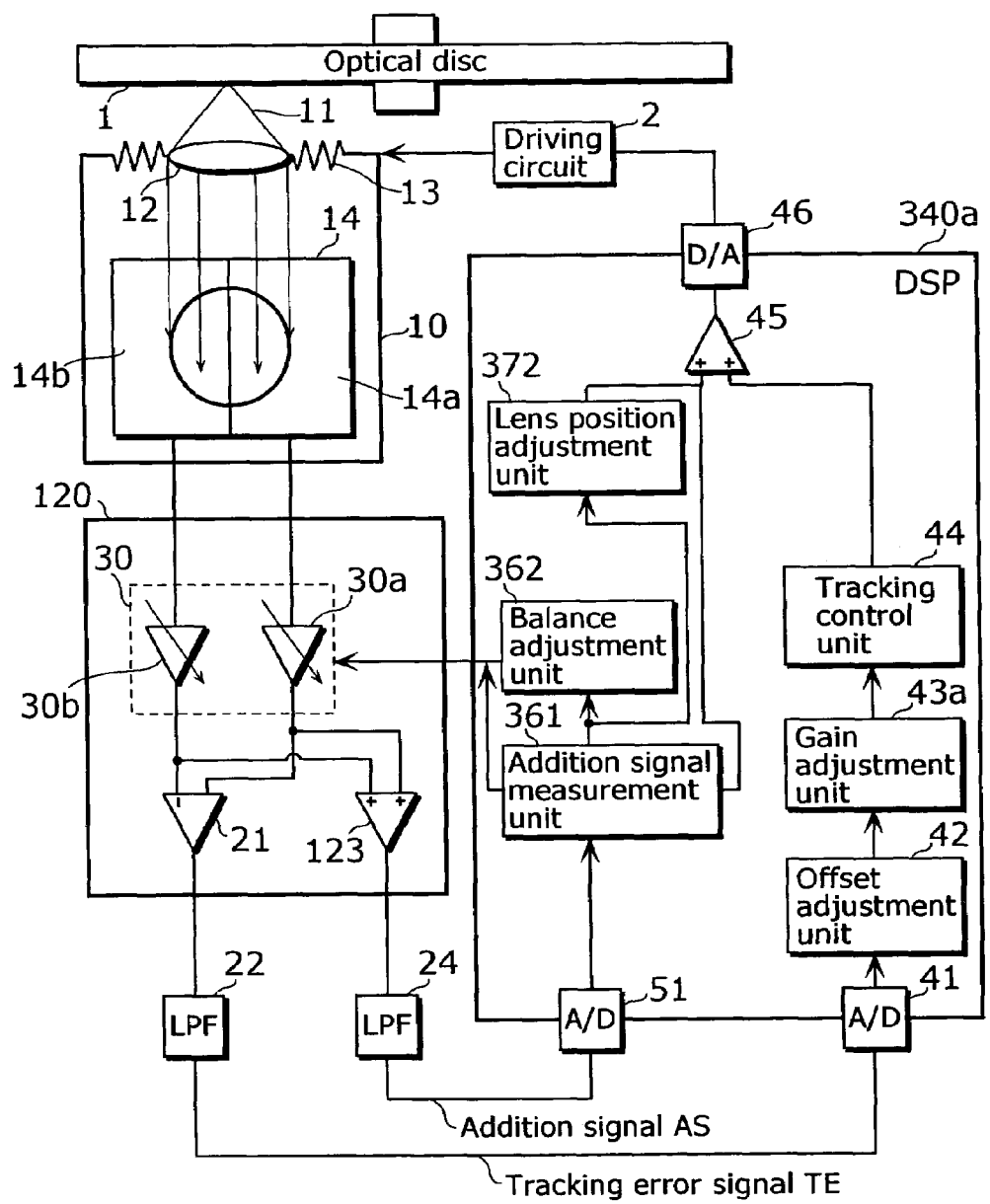
FIG. 11 is a block diagram showing another structure of the optical disc apparatus in the background art.

FIG. 11 is a block diagram showing the structure of the optical disc apparatus without any AGC unit 52 in this embodiment.

The optical disc apparatus like this has a DSP 340a that does not have any AGC unit 52 instead of a DSP 340 of the optical disc apparatus shown in FIG. 5, the DSP 340a has a gain adjustment unit 43a instead of the gain adjustment unit 43 of the optical disc apparatus shown in FIG. 5. And, the gain adjustment unit 43a changes the tracking error signal TE to be outputted from the offset adjustment unit 42 with the preset gain and outputs the tracking error signal TE.

Also, the optical disc apparatus can be formed so that it can perform only gain balance adjustments when any lens position adjustment is unnecessary, that is, the lens position of the convergence lens 12 is appropriately set, while the optical disc apparatus is formed so that it can perform gain balance adjustments and lens position adjustments in this embodiment. The optical disc apparatus like this can also perform gain balance adjustments accurately.

Figure 12:
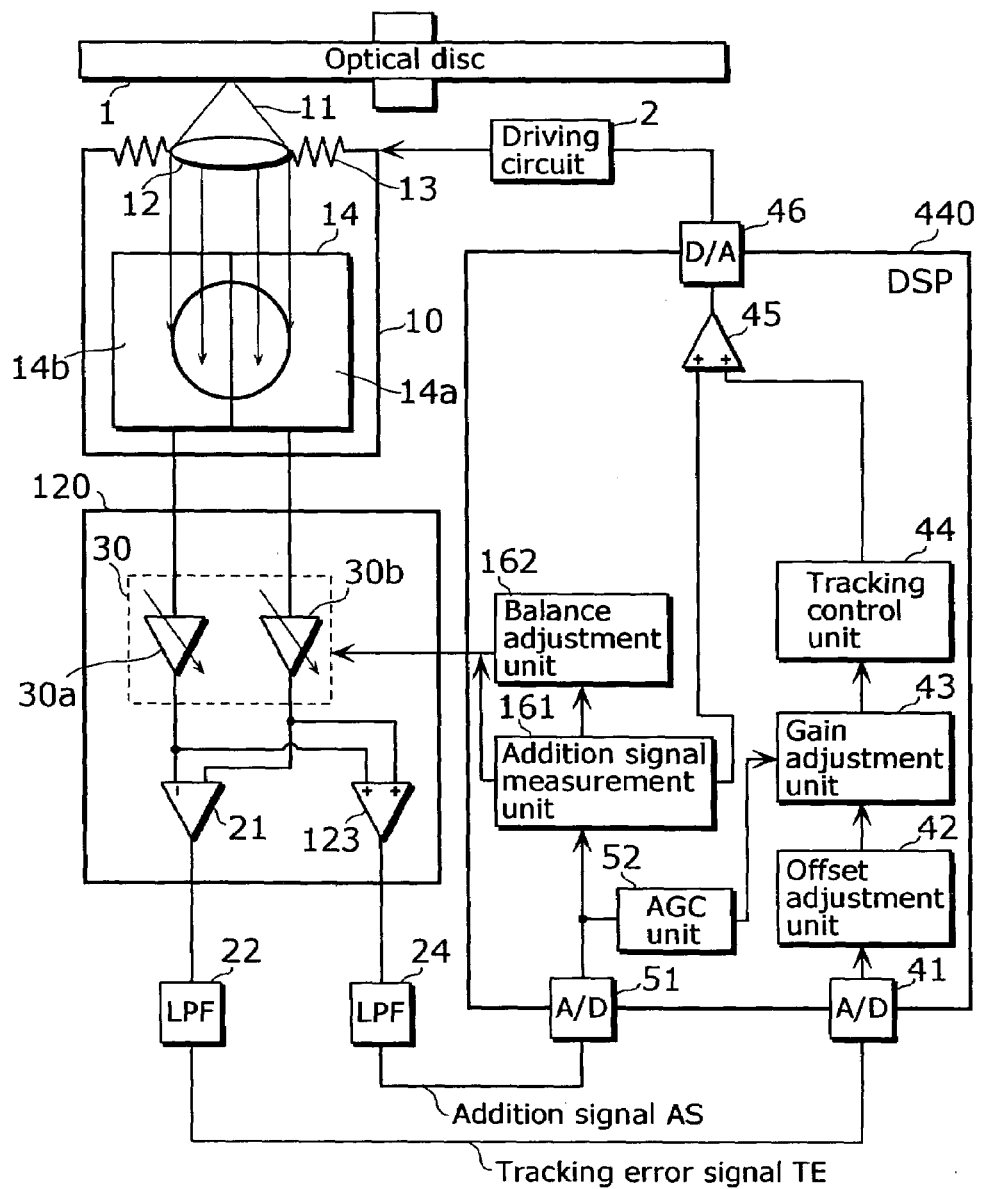
FIG. 12 is a block diagram showing another structure of the optical disc apparatus in the background art.

FIG. 12 is a block diagram showing the structure of the optical disc apparatus that is formed so that it can perform only gain balance adjustments in this embodiment.

The optical disc apparatus like this has a DSP 440 instead of a DSP 340 of the optical disc apparatus shown in FIG. 5, and this DSP 440 has a balance adjustment unit 162 and an addition signal measurement unit 161 instead of a lens position adjustment unit 372 of the optical disc apparatus shown in FIG. 5, a balance adjustment unit 362, and an addition signal measurement unit 361.

The balance adjustment unit 162 sets the gain balance ga:gb of the gain balance circuit 30 to the gain balance according to the instruction from the addition signal measurement unit 161 by changing the respective gains ga and gb of the gain circuits 30a and 30b in the gain balance circuit 30.

The addition signal measurement unit 161 drives the actuator 13 by controlling the driving circuit 2 via the lens position setting unit 45 and the D/A converter 46, shifts the convergence lens 12 in the tracking direction, and sets the lens position of the convergence lens 12 to the several preset lens positions in order.

Also, the addition signal measurement unit 161 instructs the balance adjustment unit 562 to set the gain balance of the gain balance circuit 30 at the several predetermined gain balances.

After that, the addition signal measurement unit 161 obtains and stores the addition signal AS obtained when the lens position of the convergence lens 12 is shifted to the several predetermined lens positions in the respective gain balances.

For example, the addition signal measurement unit 161 instructs the balance adjustment unit 162 set the gain balance of the gain balance circuit 30 at ga1:gb1 and change the lens position of the convergence lens 12 at x1, x2, x3, . . . when the gain balance is ga1:gb1. Also, the addition signal measurement unit 161 obtains and stores the addition signals AS1, AS2, AS3, . . . in the respective lens positions. After that, the addition signal measurement unit 161 changes the gain balance from ga1:gb1 to others and repeatedly performs the operation for obtaining and storing the addition signal AS at the respective lens positions in the after-change gain balance as mentioned above.

Further, the addition signal measurement unit 161 specifies the optimum gain balance of the gain balance circuit 30 that equalizes the outputs of the gain circuits 30a and 30b when the detection units 14a and 14b receives the same amount of light respectively based on the addition signal AS obtained in the respective gain balances of the gain balance circuit 30. More specifically, the addition signal measurement unit 161 judges whether the addition signal AS at the respective lens positions obtained in the predetermined gain balance is kept constant or not, when the gain balance is judged to be kept constant, the predetermined gain balance is specified as the optimum gain balance.

After that, the addition signal measurement unit 161 instructs the balance adjustment unit 162 to adjust the gain balance of the gain balance circuit 30 to the determined gain balance.

Gain balance adjustments are performed based on the operations by the balance adjustment unit 162 and the addition signal measurement unit 161 mentioned above.

Note that the optical disc apparatus shown in FIG. 12 can accurately adjust the gain balance of the gain balance circuit 30 to the optimum gain balance irrespective of the adjustment result of the lens position, while the above explanation is made on condition that the lens position of the convergence lens 12 has already adjusted.

Here, the optical disc apparatus shown in FIG. 12 is formed with an AGC unit 52, the optical disc apparatus can also be formed without any AGC unit 52. Even in this case, the optical disc apparatus can perform a gain balance adjustment accurately, and the reliability of the optical disc apparatus can be improved.

Figure 13:
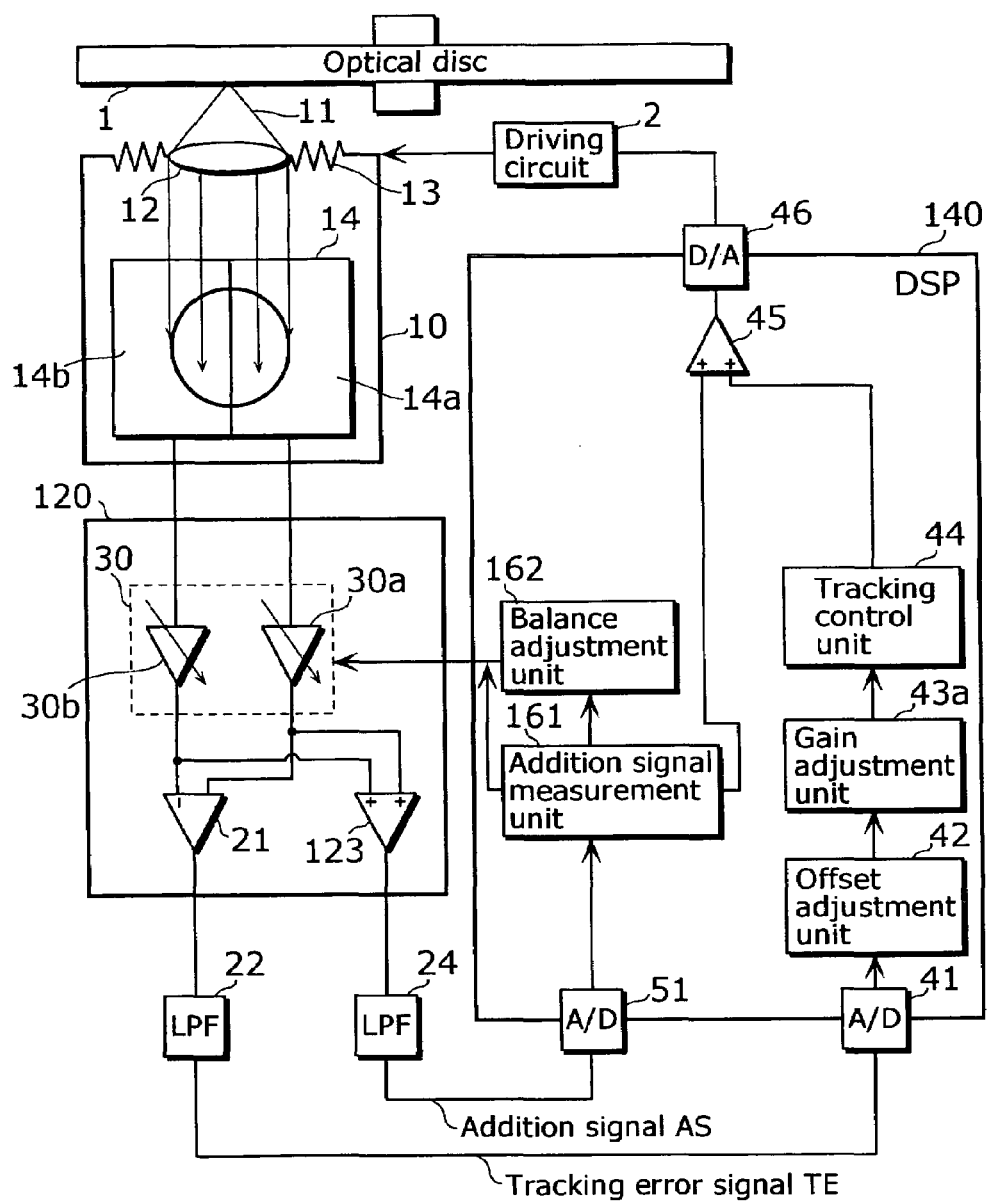
FIG. 13 is a block diagram showing another structure of the optical disc apparatus in the background art.

FIG. 13 is a block diagram showing the structure of the optical disc apparatus without an AGC unit 52.

The optical disc apparatus like this has a DSP 140 without an AGC unit 52 instead of a DSP 440 of the optical disc apparatus shown in FIG. 12, and this DSP 140 has a gain adjustment unit 43a instead of the gain adjustment unit 43 of the optical disc apparatus shown in FIG. 12. Also, the gain adjustment unit 43a changes the tracking error signal TE outputted from the offset adjustment unit 42 and outputs the signal.

Also, the optical disc apparatus can be formed so that it can perform only lens position adjustments when any gain balance adjustments is unnecessary, that is, the gain balance of the gain balance circuit 30 is appropriately set, while the optical disc apparatus is formed so that it can perform gain balance adjustments and lens position adjustments in this embodiment. The optical disc apparatus like this can also perform lens position adjustments accurately.

Figure 14:
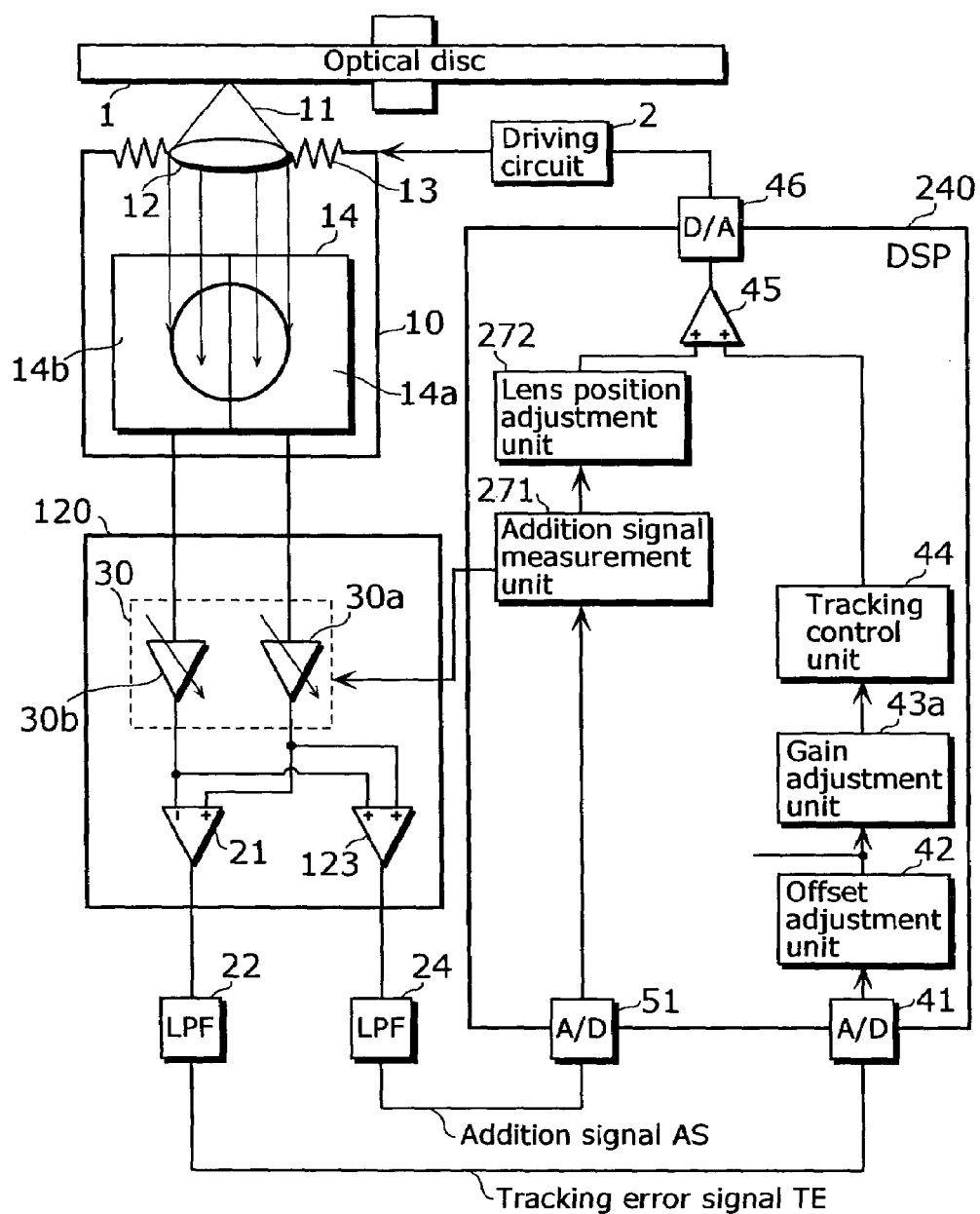
FIG. 14 is a block diagram showing another structure of the optical disc apparatus in the background art.

FIG. 14 is a block diagram showing the structure of the optical disc apparatus formed so that it can perform only lens position adjustments.

The optical disc apparatus like this has a DSP 240 instead of a DSP 340 of the optical disc apparatus shown in FIG. 5, and this DSP 240 has a gain adjustment unit 43a, a lens position adjustment unit 272, and an addition signal measurement unit 271 instead of a lens position adjustment unit 372, a balance adjustment unit 362, an addition signal measurement unit 361, a gain adjustment unit 43 and an AGC unit 52 of the optical disc apparatus shown in FIG. 5.

The gain adjustment unit 43a changes the tracking error signal TE outputted from the offset adjustment unit 42 and outputs the signal.

The lens position adjustment unit 272 drives the actuator 13 and has it shift the convergence lens 12 in the tracking direction by controlling the driving circuit 2 via the lens position setting unit 45 and the D/A converter 46, and sets the lens position of the convergence lens 12 at the lens position based on the instruction from the addition signal measurement unit 271.

The addition signal measurement unit 271 instructs the lens position adjustment unit 272 to set the convergence lens 12 at the determined lens position and change the gain balance of the gain balance circuit 30 to the several predetermined gain balances at the lens position. Also, the addition signal measurement unit 271 obtains the addition signal AS in the respective gain balances from the A/D converter 51. Further, the addition signal measurement unit 271 instructs the lens position adjustment unit 272 to change the lens position of the convergence lens 12 from the above-mentioned predetermined lens position to the several predetermined lens positions, and then the addition signal measurement unit 271 obtains the addition signal AS when changing the gain balance like mentioned above in the respective lens positions.

Here, the addition signal measurement unit 271 makes the gain balances $(1+g1):(1-g1)$, $(1+g2):(1-g2)$, . . . $(1+gm):(1-gm)$ which satisfy "$0<g1, g2, \ldots gm<1$" when setting the above-mentioned respective gain balances. Also, in this case, the gain balance is appropriately adjusted when the respective gain balances of the gain circuits 30a and 30b of the gain balance circuit 30 are equal to each other.

After that, the addition signal measurement unit 271 specifies the lens position that makes the addition signal AS become constant in the respective gain balances as the optimum lens position based on the additional signal AS obtained as mentioned above, and instructs the lens position adjustment unit 272 to adjust the lens position of the convergence lens 12 to the determined lens position by notifying the lens position adjustment unit 272 of the determined lens position.

Lens position adjustments are performed based on the operations by the lens position adjustment unit 272 and the addition signal measurement unit 271 mentioned above.

Note that the optical disc apparatus shown in FIG. 14 can adjust the lens position of the convergence lens 12 to the optimum lens position accurately irrespective of the adjustment result of the gain balance using a setting method of a gain balance as a parameter and a processing method of the obtained addition signal AS, while the above explanation is made on condition that the gain balance of the gain balance circuit 30 has already been adjusted.

(Second Embodiment)

The optical disc apparatus in a second embodiment of the present invention will be explained below with reference to figures.

Figure 15:
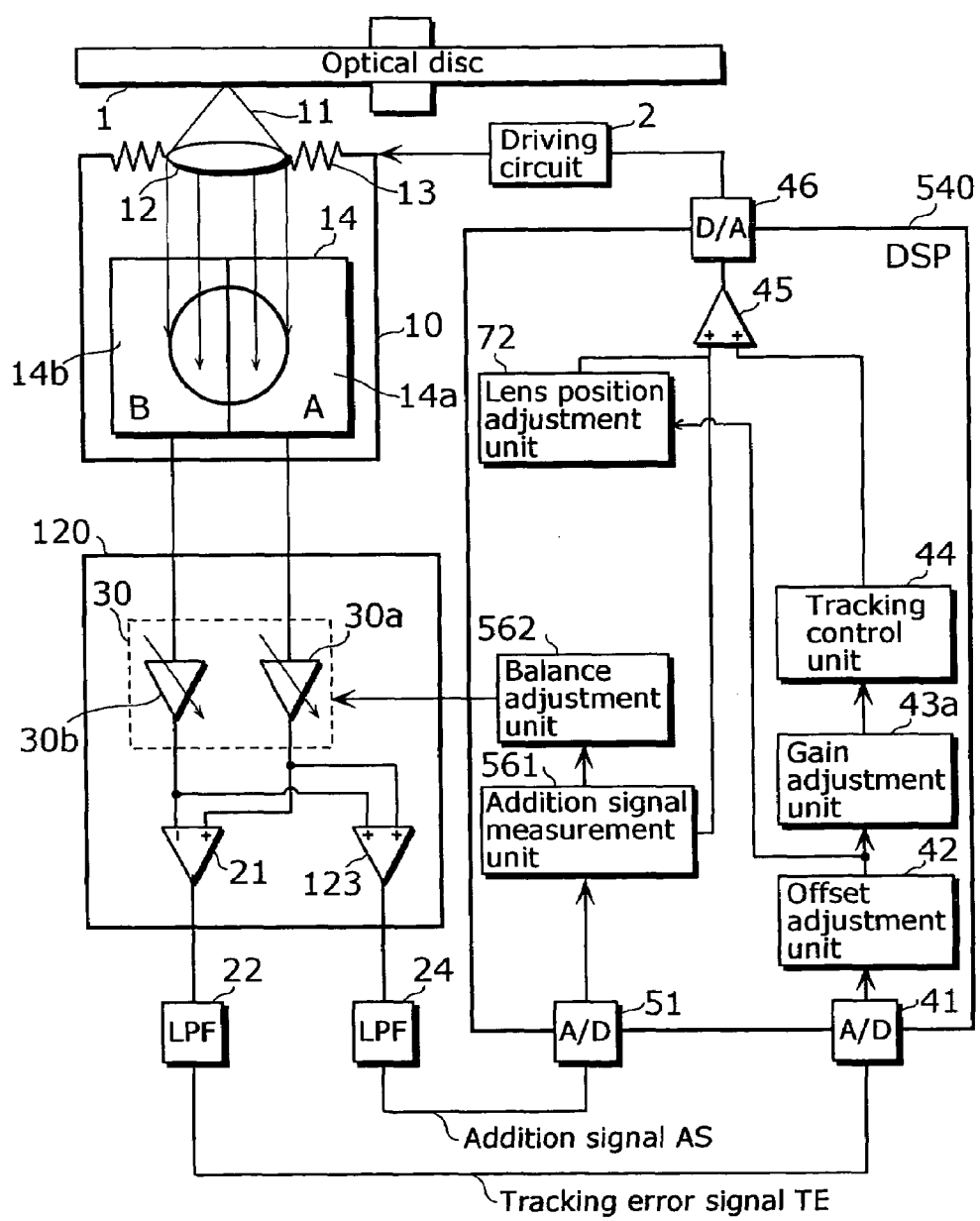
FIG. 15 is a block diagram showing the structure of the optical disc apparatus in a second embodiment of the present invention.

FIG. 15 is a block diagram showing the structure of the optical disc apparatus in the second embodiment of the present invention.

The optical disc apparatus in this embodiment is capable of performing lens position adjustments and gain balance adjustments accurately, and comprises an optical pick up 10, a control signal generation circuit 120, LPF 22 and 24, both of which consist of a lowpass filter, a digital signal processor 540 (called "DSP" from here), and a driving circuit 2.

Here, the optical pick up 10, the control signal generation circuit 120, the LPF 22 and 24 and the driving circuit 2 have the same structures and functions respectively as the ones equipped in the first embodiment.

The DSP 540 adjusts the gain balance of the gain balance circuit 30 of the control signal generation circuit 120 based on the tracking error signal TE outputted from the control signal generation circuit 120 via the LPF 22 and the addition signal AS outputted from the control signal generation circuit 120 via the LPF 24, adjusts the lens position of the convergence lens 12 of the optical pick up 10, and performs a tracking control.

After that, the DSP 540 in this embodiment comprises A/D converters 41 and 51, an offset adjustment unit 42, a gain adjustment unit 43a, a tracking control unit 44, an addition signal measurement unit 561, a balance adjustment unit 562, a lens position adjustment unit 572, a lens position setting unit 45 and a D/A converter 46.

The A/D converter 41 converts the tracking error signal TE from analog to digital and outputs the signal to the offset adjustment unit 42, and the A/D converter 51 converts the addition signal AS from analog to digital and outputs the signal to the addition signal measurement unit 561.

The offset adjustment unit 42 detects the offset factor, which occurs in the circuit, to the tracking error signal TE under the condition where no spot of reflection light is found in the light detection device 14, for example, when the laser radiation element is off or the focus of the convergence lens 12 is taken away from the information recording surface of the optical disc 1. The offset adjustment unit 42 also adds an offset appropriate to the factor to the tracking error signal TE, and outputs the addition result.

The gain adjustment unit 43a adjusts the gain of the output (tracking error signal TE) from the offset adjustment unit 42.

The tracking control unit 44, on obtaining the tracking error signal TE from the gain adjustment unit 43a, calculates the tracking driving value by filter operation for performing phase compensation or low frequency compensation based on the tracking error signal TE, and outputs the tracking control signal showing the tracking driving value to the lens position setting unit 45.

The balance adjustment unit 562 sets the gain balance ga:gb of the gain balance circuit 30 at the gain balance according to the instruction from the addition signal measurement unit 561 by changing the gain ga of the gain circuit 30a and the gain gb in the gain circuit 30b of the gain balance circuit 30.

The addition signal measurement unit 561 drives the actuator 13 by controlling the driving circuit 2 via the lens position setting unit 45 and the D/A converter 46, shifts the convergence lens 12 in the tracking direction, and sets the lens position of the convergence lens 12 at the several predetermined lens positions in order.

Also, the addition signal measurement unit 561 instructs the balance adjustment unit 562 to set the gain balance of the gain balance circuit 30 at the several predetermined gain balances.

After that, the addition signal measurement unit 561 obtains and stores the addition signal AS when the lens position of the convergence lens 12 is shifted to the several predetermined lens positions in the respective gain balances.

For example, the addition signal measurement unit 561 instructs the balance adjustment unit 562 to set the gain balance of the gain balance circuit 30 to ga1:gb1 and shift the lens position of the convergence lens 12 when the gain balance is ga1:gb1 to x1, x2, . . . x3 and so on. Also, the addition signal measurement unit 561 obtains and stores the addition signals AS1, AS2, AS3, . . . in the respective lens positions. After that, the addition signal measurement unit 561 changes the gain balance from ga1:gb1 to others and repeatedly executes the operation for obtaining and storing the addition signal AS in the respective lens positions in the after-change gain balance as mentioned above.

Further, the addition signal measurement unit 561 specifies the optimum gain balance of the gain balance circuit 30 that makes the outputs from the gain circuits 30a and 30b out of the addition signal AS obtained in the respective gain balances of the gain balance circuit 30 as mentioned above when the detection units 14a and 14b receive the same amount of light. More specifically, the addition signal measurement unit 561 judges whether the addition signal AS at the respective lens positions obtained in the determined gain balance is kept constant or not, when the gain balance is judged to be kept constant, the determined gain balance is specified as the optimum gain balance.

Also, the addition signal measurement unit 561 instructs the balance adjustment unit 562 to adjust the gain balance of the gain balance circuit 30 to the determined gain balance by notifying the balance adjustment unit 562 of the determined gain balance.

The lens position adjustment unit 572 obtains the tracking error signal TE where an offset is applied by the offset adjustment unit 42, and outputs the lens position adjustment signal for adjusting the lens position of the convergence lens 12 so as to make the tracking error signal TE "0".

As offset factors that may occur in the circuit is eliminated from the tracking error signal TE outputted from the offset adjustment unit 42, when the gain balance of the gain balance circuit 30 is set at the optimum gain balance, any offset based on the gain balance to the tracking error signal TE is not needed. However, if the lens position of the convergence lens 12 is not set at the optimum lens position, the offset factor based on the lens position is included in the tracking error signal TE outputted from the offset adjustment unit 42. Therefore, the lens position adjustment unit 572 eliminates the offset factor based on the lens position by outputting the lens position adjustment signal so as to make the output from the offset adjustment unit 42 "0". Also, consequently, the convergence lens 12 is set at the optimum lens position.

The lens position setting unit 45 adds the tracking control signal from the tracking control unit 44 to the lens position adjustment signal from the lens position adjustment unit 572, and outputs the addition result as the tracking driving signal to the D/A converter 46.

The D/A converter 46 converts the tracking driving signal from the lens position setting unit 45 from digital to analog and outputs the signal to the driving circuit 2.

The driving circuit 2, on obtaining the tracking driving signal outputted from the DSP 40, drives the actuator 13 of the optical pick up 10 according to the tracking driving signal by amplifying the current of the tracking driving signal and outputting the signal.

In this way, the convergence lens 12 of the optical pick up 10 is shifted in the tracking direction in a way that the spot of the optical beam 11 can follow the tracks of the optical disc 1 making the optimum lens position the center (the optimum lens position is the lens position shown by the lens position adjustment signal outputted from the lens position adjustment unit 372.)

A series of operations performed by the optical disc apparatus like this in this embodiment will be explained with reference to FIG. 16.

Figure 16:
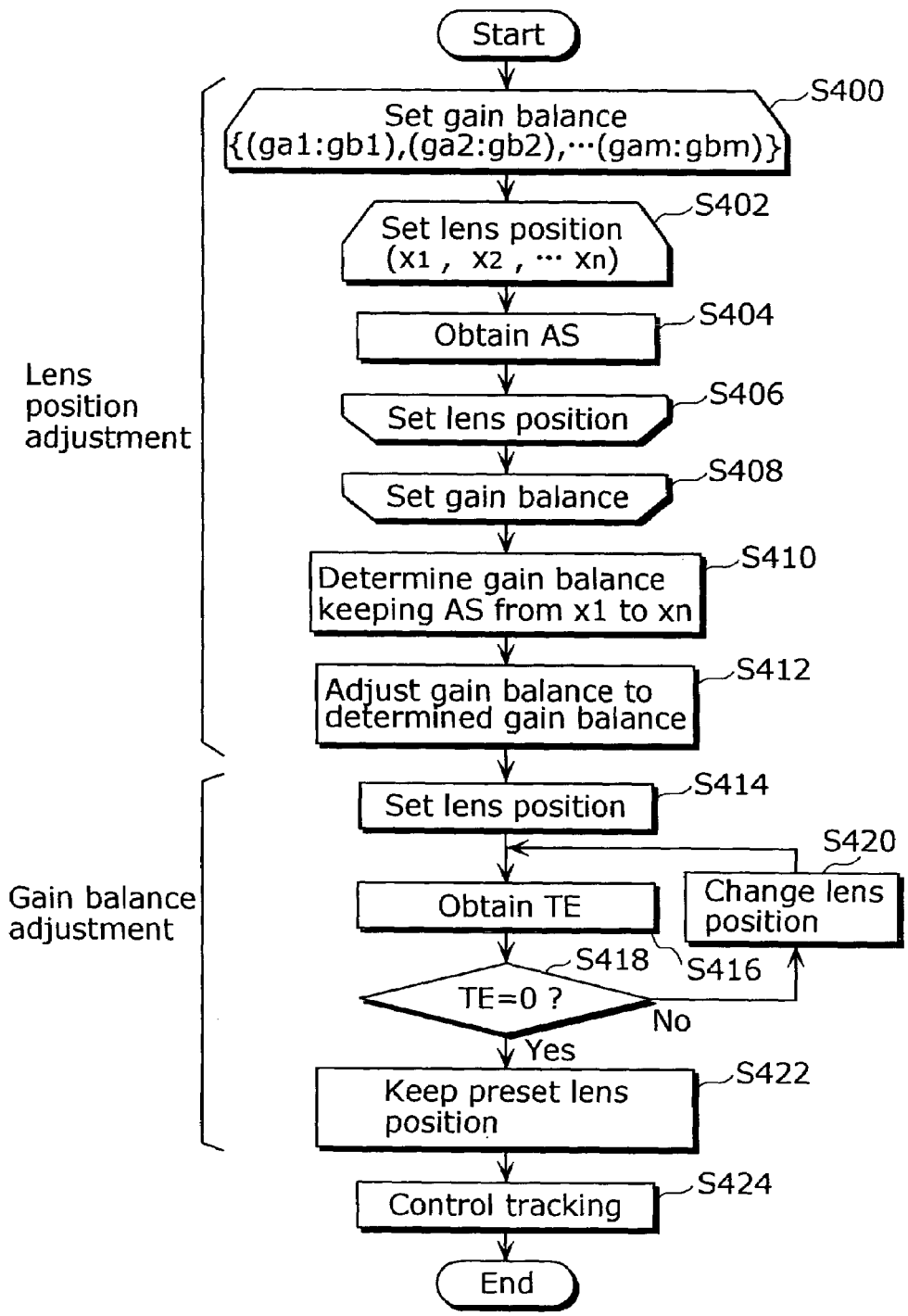
FIG. 16 is a flow chart showing the overall operation sequence of the optical disc apparatus in the background art.

FIG. 16 is a flow chart showing the overall operation sequence by the optical disc apparatus in this embodiment.

First, the addition signal measurement unit 561 has the balance adjustment unit 562 to set the gain balance of the gain balance circuit 30 at one of the predetermined gain balance ga1:gb1 out of the predetermined gain balances (ga1:gb1, ga2:gb2, . . . gam:gbm) (step S400).

Next, the addition signal measurement unit 561 has the actuator 13 set the convergence lens 12 at the lens position x1 out of the predetermined lens positions x1, x2, . . . xn (step S402) by controlling the driving circuit 2 via the lens position setting unit 45 and the D/A converter 46.

After that, the addition signal measurement unit 561 obtains the addition signal AS when the gain balance is ga1:gb1 and the lens position is x1 (step S404). After finishing the obtainment of the addition signal AS like this, the addition signal measurement unit 561 shifts the lens position of the convergence lens 12 to x2 and reobtains the addition signal AS and repeatedly executes the operation for obtaining the addition signal AS for each of all the remaining predetermined lens positions x3, . . . xn as well (steps S402~S406).

After finishing the obtainment of the addition signal AS when the gain balance is ga1:gb1 like this, the addition signal measurement unit 561 changes the gain balance of the gain balance circuit 30 at ga2:gb2 (step S400), and obtains the addition signal AS for all the predetermined lens positions x1, x2, . . . xn when the gain balance is ga2:gb2 (steps S402~S406). Further, the addition signal measurement unit 561 repeatedly executes the operation for obtaining the addition signal AS at the respective lens positions in the determined gain balance like this for all the remaining predetermined gain balances (ga3:gb3, . . . gam:gbm) (steps S400~S408).

Next, the addition signal measurement unit 561 finds out the gain balance that makes the addition signal AS at the respective lens positions become constant based on the above-mentioned obtained result and specifies the gain balance as the optimum gain balance (step S410).

After that, the addition signal measurement unit 561 has the balance adjustment unit 562 adjust the gain balance of the gain balance circuit 30 so that the gain balance of the gain balance circuit 30 becomes the above-mentioned predetermined gain balance (step S412). In this way, gain balance adjustments are performed.

Next, the lens position adjustment unit 572 has the actuator 13 set the convergence lens 12 at the determined lens position by controlling the driving circuit 2 via the lens position setting unit 45 and the D/A converter 46 (step S414), and obtains the tracking error signal TE outputted from the offset adjustment unit 42 in the lens position (step S416).

Here, the lens position adjustment unit 572 judges whether the obtained tracking error signal TE is "0" or not (step S418), changes the lens position of the convergence lens 12 from the determined lens position to other lens position (step S420) when the tracking error signal TE is judged to be not "0" (step S418: No), and obtains the tracking error signal TE in the lens position (step S416). On the other hand, the lens position adjustment unit 572 specifies the lens position as the optimum lens position and has the actuator 13 keep the lens position (step S422) when the tracking error signal TE is judged to be "0" (step S418: Yes). In this way, lens position adjustments are performed.

Also, after gain balance adjustments and lens position adjustments are performed in this way, the DSP 540 of the optical disc apparatus obtains the tracking error signal TE and performs a tracking control that makes the beam spot of the optical beam 11 follow the tracks of the optical disc 1 like in the background art (step S424).

In this way, in this embodiment, as gain balance adjustments are performed based on the addition signal AS in response to changes in gain balance and lens position like in the first embodiment, there is no need to perform any lens position adjustments previously like in the background art, in other words, it is possible to perform gain balance adjustments accurately irrespective of the result of the lens position adjustment. Further, it is also possible to perform lens position adjustments accurately without including a lot of detection errors unlike in the background art because lens position adjustments are performed so that the tracking error signal TE becomes "0" in this embodiment. Consequently, it is possible to stabilize the tracking control and improve the reliability of the optical disc apparatus in this embodiment.

Note that it is possible to change the gain balance of the gain balance circuit 30 by keeping either one of the gain circuit 30a or 30b and increasing or decreasing the other gain as the gain circuits 30a and 30b which are capable of increasing or decreasing the gain are used for the gain balance circuit 30 in the first and the second embodiments. In this way, it is possible to simplify the circuit structure of the gain balance circuit 30.

Also, the gain balance of the gain balance circuit 30 is altered at random so as to perform a gain balance adjustment in the first and the second embodiments, but the gain balance can be changed to the one that follows (1+g):(1−g) as long as it satisfies "0<g<1" as when performing a lens position adjustment. This time, it is also possible to change the gain balance so that the addition result of the gain of the gain circuit 30a and the gain of the gain circuit 30b remains constant. This time, the DSP 340, 340a, 440, 140, 240 and 540 can change the gain balance of the gain balance circuit 30 by specifying only the g value without specifying the respective gains of the gain circuits 30a and 30b in the gain balance circuit 30 and simplify the control of the gain balance circuit 30.

Also, the gain balance that makes the addition signal AS become constant even if the lens position changes is specified when performing a gain balance adjustment in the first and the second embodiments, but it is also possible to use the change rate of the addition signal AS to the lens position for judging whether the addition signal AS like this becomes constant or not. In other words, the DSP of the optical disc apparatus calculates the change rate from the obtained result of the addition signal AS and specifies the gain balance that makes the change rate "0".

This time, the DSP of the optical disc apparatus can show the relation between the change rate and the gain balance with linear function approximation and specify the gain balance that makes the change rate shown by the linear function "0". In this case, as the relation between the change rate and the gain balance approximates the linear function, it is possible to specify the optimum gain balance accurately by reducing the number of the obtainment (measurement) times of the addition signal AS.

Also, it is possible to perform a gain balance adjustment by changing the lens position only twice, while the lens position is shifted over three times so as to obtain the addition signal AS in response to changes in the lens position when performing a gain balance adjustment in the first and the second embodiments.

In this case, the DSP of the optical disc apparatus shows the relation between the gain balance and the addition signal AS with linear function approximation based on the addition signal AS obtained when the gain balance is changed in the determined lens position and other lens positions. And the DSP specifies the gain balance shown by the intersection of these linear functions as the optimum gain balance. In this way, the optimum gain balance that reduces the number of times needed for changing the lens position can be specified accurately.

As mentioned above, the lens position that makes the addition signal AS constant even if the gain balance changes is specified when performing a lens position adjustment in the first embodiment, but the change rate of the addition signal AS to the gain balance can be used for judging whether the addition signal AS becomes constant or not. In other words, the DSP of the optical disc apparatus calculates the change rate from the obtained result of the addition signal AS and specifies the lens position that makes the change rate "0".

This time, the DSP of the optical disc apparatus can show the relation between the change rate and the lens position with linear function approximation and specify the lens position that makes the change rate shown by the linear function "0". In this case, it is possible to specify the optimum lens position accurately by reducing the number of the obtainment (measurement) times of the addition signal AS because the relation between the change rate and the lens position approximates the linear function.

Also, it is possible to perform a lens position adjustment by changing the gain balance only twice, while the gain balance is changed over three times so as to obtain the addition signal AS in response to changes in gain balance when performing a lens position adjustment in the first embodiment.

In this case, the DSP of the optical disc apparatus show the relation between the lens position and the addition signal AS with linear function approximation based on the addition signal AS obtained when the lens position is shifted in the determined gain balance and other gain balances. After that, the DSP specifies the lens position shown by the intersection of these linear functions as the optimum lens position. In this way, it is possible to specify the optimum lens position accurately by reducing the number of times of changing the gain balance.

What is claimed is:

1. An optical disc apparatus for recording or playing back optical information on an optical disc, comprising:
   a convergence lens for converging an optical beam onto the optical disc;
   a light detection device, including a first detection portion and a second detection portion, operable to receive and detect the optical beam reflected by the optical disc on each detection portion in a tracking direction, and output a first detection signal corresponding to a detected result from either one of the detection portions and a second detection signal corresponding to a detected result from the other detection portions;
   a lens shifting unit operable to shift the light receiving area of the light detection device in a tracking direction by shifting the convergence lens in the tracking direction;
   an amplifying unit operable to change a gain balance by amplifying the first and the second detection signals using independent gains respectively;
   an addition unit operable to output an addition signal by adding the first detection signal to the second detection signal in response to the shift in lens position of the convergence lens and the change in gain balance made by the lens shifting unit and the amplifying unit; and
   a gain balance adjustment unit operable to obtain the addition signal outputted from the addition unit, specify a gain balance that equalizes detection sensitivities of the respective detection portions in the light detection device based on the obtained result, and control the amplifying unit so as to have the amplifying unit amplify the first and the second detection signals using the specified gain balance.

2. The optical disc apparatus according to claim 1, wherein the gain balance adjustment unit specifies a predetermined gain balance as a gain balance that equalizes detection sensitivities of the respective detection portions in the light detection device in the case where an addition signal becomes constant when a lens position shifts in the predetermined gain balance.

3. The optical disc apparatus according to claim 2, further comprising:
   a lens position adjustment unit operable to obtain the addition signal outputted from the addition unit, specify a lens position that equalizes sizes of respective light receiving areas of the detection portions in the light detection device based on an obtained result, and control the lens shifting unit so that the convergence lens shifts to the determined lens position.

4. The optical disc apparatus according to claim 3, wherein the lens position adjustment unit specifies the predetermined lens position as a lens position that equalizes sizes of the respective light receiving areas of the detection portions in the light detection device in the case where an addition signal becomes constant when a gain balance changes at the predetermined lens position.

5. The optical disc apparatus according to claim 4, wherein the lens position adjustment unit specifies the predetermined lens position as a lens position that equalizes the sizes of the respective light receiving areas of the detection portions in the light detection device in the case where a change rate of the addition signal on a gain balance becomes "0" at the predetermined lens position.

6. The optical disc apparatus according to claim 5, wherein the amplifying unit changes a gain balance so that an addition result of a gain of the first detection signal and a gain of the second detection signal becomes constant.

7. The optical disc apparatus according to claim 5, wherein the amplifying unit changes a gain of either one of the first detection signal or the second detection signal.

8. The optical disc apparatus according to claim 4, wherein the amplifying unit changes the gain balance to a first gain balance and a second gain balance, and the lens position adjustment unit shows a relation between a lens position and an addition signal in the first gain balance with function approximation, shows a relation between a lens position and an addition signal in the second gain balance with function approximation, and specifies a lens position shown by an intersection of both functions as a lens position that equalizes the sizes of the respective light receiving areas of the detection portions in the light detection device.

9. The optical disc apparatus according to claim 3, further comprising:
a subtraction unit operable to output a subtraction signal by calculating the difference between the first detection signal and the second detection signal whose gain balance is adjusted by the gain balance adjustment unit;
a subtraction signal amplifying unit operable to amplify the subtraction signal;
a gain adjustment unit operable to change the gain of the subtraction signal amplifying unit in response to the addition signal outputted from the addition unit; and
a tracking control unit operable to control the lens shifting unit so that the optical beam can follow the tracks of the optical disc based on the subtraction signal amplified by the subtraction signal amplifying unit.

10. The optical disc according to claim 2, wherein the gain balance adjustment unit specifies the predetermined gain balance as the gain balance that equalizes the detection sensitivities in the respective detection portions in the light detection device in the case where a change rate of the addition signal on the lens position becomes "0" in the predetermined gain balance.

11. The optical disc apparatus according to claim 2, wherein the lens shifting unit shifts the convergence lens to a first lens position and a second lens position, the gain balance adjustment unit shows a relation between a gain balance and an addition signal in the first lens position with function approximation, shows a relation between a gain balance and an addition signal in the second lens position with function approximation, and specifies a gain balance shown by an intersection of both functions as a gain balance that equalizes the detection sensitivities of the respective detection portions in the light detection device.

12. An optical disc apparatus for recording or playing back optical information on an optical disc, comprising:
a convergence lens for converging an optical beam onto the optical disc;
a light detection device, including a first detection portion and a second detection portion, operable to receive and detect the optical beam reflected by the optical disc on each detection portion in a tracking direction, and output a first detection signal corresponding to a detected result from either one of the detection portions and a second detection signal corresponding to a detected result from the other detection portion;
a lens shifting unit operable to shift a light receiving area in the light detection device in a tracking direction by shifting the convergence lens in the tracking direction;
an amplifying unit operable to change a gain balance by amplifying the first and the second detection signals using independent gains respectively;
an addition unit operable to output an addition signal by adding the first detection signal to the second detection signal in response to the shift in lens position of the convergence lens and the change in gain balance made by the lens shifting unit and the amplifying unit; and
a lens position adjustment unit operable to obtain the addition signal outputted from the addition unit, specify a lens position that equalizes sizes of respective light receiving areas of the detection portions in the light detection device based on an obtained result, and control the lens shifting unit so that the convergence lens shifts to the determined lens position.

13. The optical disc apparatus according to claim 12, wherein the lens position adjustment unit specifies the predetermined lens position as the lens position that equalizes the sizes of the respective light receiving areas of the detection portions in the light detection device in the case where the addition signal becomes constant when the gain balance changes in the predetermined lens position.

14. A control device for controlling an optical head of an optical disc apparatus for recording or playing back optical information on the optical disc,
wherein the optical head comprises:
a convergence lens for converging optical beam onto the optical disc;
a light detection device, including a first detection portion and a second detection portion, operable to receive and detect the optical beam reflected by the optical disc on each detection portion in a tracking direction, and output a first detection signal corresponding to a detected result from either one of the detection portions and a second detection signal corresponding to a detected result from the other detection portion; and
a lens shifting unit operable to shift a light receiving area in the light detection device in a tracking direction by shifting the convergence lens in the tracking direction;
wherein the control device comprises:
an amplifying unit operable to change a gain balance by amplifying the first and the second detection signals using independent gains respectively;
an addition unit operable to output an addition signal by adding the first detection signal to the second detection signal in response to the shift in lens position of the convergence lens and the change in gain balance made by the lens shifting unit and the amplifying unit; and
a gain balance adjustment unit operable to obtain the addition signal outputted from the addition unit, specify a gain balance that equalizes detection sensitivities of the respective detection portions in the light detection device based on an obtained result, and control the amplifying unit so as to have the amplifying unit amplify the first and the second detection signals using the specified gain balance.

15. The control device according to claim 14, wherein the gain balance adjustment unit specifies the predetermined gain balance as a gain balance that equalizes the detection sensitivities of the respective detection portions in the light detection device in the case where the addition signal becomes constant when the lens position changes in the predetermined gain balance.

16. The control device according to claim 15, further comprising:
a lens position adjustment unit operable to obtain the addition signal outputted from the addition unit, specify the lens position that equalizes sizes of the respective light receiving areas of the detection portions in the light detection device based on the obtained result, and control the lens shifting unit so that the convergence lens shifts to the determined lens position.

17. The control device according to claim 16,
wherein the lens position adjustment unit specifies the predetermined lens position as the lens position that equalizes the sizes of the respective light receiving areas of the detection portions in the light detection device in the case where the addition signal becomes constant when the gain balance changes at the predetermined lens position.

18. The control device according to claim 17,
wherein the lens position adjustment unit specifies the predetermined lens position as the lens position that equalizes the sizes of the respective light receiving areas of the detection portions in the light detection device in the case where a change rate of the addition signal on the gain balance becomes "0" at the predetermined lens position.

19. The control device according to claim 18,
wherein the amplifying unit changes the gain balance so that an addition result of a gain of the first detection signal and a gain of the second detection signal becomes constant.

20. The control device according to claim 18,
wherein the amplifying unit changes a gain of either one of the first detection signal or the second detection signal.

21. The control device according to claim 17,
wherein the amplifying unit changes the gain balance to the first and the second gain balances,
the lens position adjustment unit shows a relation between a lens position and an addition signal in the first gain balance with function approximation, shows a relation between a lens position and an addition signal in the second gain balance with function approximation, and specifies a lens position shown by an intersection of both functions as a lens position that equalizes the sizes of the respective light receiving areas of the detection portions in the light detection device.

22. The control device according to claim 16, further comprising:
a subtraction unit operable to output a subtraction signal by calculating a difference between the first detection signal and the second detection signal whose gain balance is adjusted by the gain balance adjustment unit;
a subtraction signal amplifying unit operable to amplify the subtraction signal;
a gain balance adjustment unit operable to change the gain of the subtraction signal amplifying unit in response to the addition signal outputted from the addition unit; and
a tracking control unit operable to control the lens shifting unit so that the optical beam can follow the tracks of the optical disc based on the subtraction signal amplified by the subtraction signal amplifying unit.

23. The control device according to claim 15,
wherein the gain balance adjustment unit specifies the predetermined gain balance as the gain balance that equalizes the detection sensitivities of the respective detection portions in the light detection device in the case where a change rate of the addition signal on the lens position becomes "0" in the predetermined gain balance.

24. The control device according to claim 15, further comprising:
a shifting control unit operable to control the lens shifting unit so that the convergence lens shifts to a first lens position and a second lens position;
wherein the gain balance adjustment unit shows a relation between a gain balance and an addition signal in the first lens position with function approximation, shows a relation between a gain balance and an addition signal in the second lens position with function approximation, and specifies a gain balance shown by an intersection of both functions as a gain balance that equalizes the detection sensitivities in the respective detection portions of the light detection device.

25. A control signal generation circuit that generates a control signal for controlling an optical head of an optical disc apparatus for recording or playing back optical information on an optical disc,
wherein the optical head comprises:
a convergence lens for converging optical beam onto the optical disc; and
a light detection device, including a first detection portion and a second detection portion operable to receive and detect the optical beam reflected by the optical disc on each detection portion in a tracking direction, and output a first detection signal corresponding to a detected result from either one of the detection portions and a second detected signal corresponding to a detected result from the other detection portion;
wherein the control signal generation circuit comprises:
an amplifying unit operable to change a gain balance by amplifying a first and a second detection signals using independent gains respectively; and
an output unit operable to add the first detection signal to the second detection signal in response to changes in gain balance made by the amplifying unit, calculate a difference between the first detection signal and the second detection signal, and output the control signal according to both operation results.

26. The control signal generation circuit according to claim 25,
wherein the amplifying unit changes a gain of either one of the first detection signal and the second detection signal.

27. The control signal generation circuit according to claim 25,
wherein the amplifying unit changes the gain balance so that the addition result of the gain to the first detection signal and the gain to the second detection signal becomes constant.

28. A control method for controlling an optical head of an optical disc apparatus for recording or playing back optical information on an optical disc,
wherein the optical head comprises:
a convergence lens for converging optical beam onto the optical disc;
a light detection device, including a first detection portion and a second detection portion operable to receive and detect the optical beam reflected by the optical disc on each detection portion in a tracking direction, and output a first detection signal corresponding to a detected result from either one of the detection portions and a second detection signal corresponding to a detected result from the other detection portion; and a lens shifting unit operable to shift a light receiving area in the light detection device in a tracking direction by shifting the convergence lens in the tracking direction;

the control method comprising:

a gain balance changing step of changing the gain balance by amplifying the first and the second detection signals using independent gains respectively;

a lens shifting step of changing light receiving area in the light detection device by shifting the convergence lens in the tracking direction;

an addition signal outputting step of outputting an addition signal by adding the first detection signal to the second detection signal in response to the shift in lens position and the change in gain balance in the gain balance changing step and the lens shifting step; and a gain balance adjustment step of specifying the gain balance that equalizes the detection sensitivities of the respective detection portions in the light detection device based on the addition signal outputted in the addition signal outputting step, and amplifying the first and the second detection signals using the specified gain balance.

29. A control device for controlling an optical head of an optical disc apparatus for recording or playing back optical information on the optical disc, wherein the optical head comprises:

a convergence lens for converging an optical beam onto the optical disc;

a light detection device, including a first detection portion and a second detection portion, operable to receive and detect the optical beam reflected by the optical disc on each detection portion in a tracking direction, and output a first detection signal corresponding to a detected result from either one of the detection portions and a second detected signal corresponding to a detected result from the other detection portion; and a lens shifting unit operable to shift a light receiving area in the light detection device in a tracking direction by shifting the convergence lens in the tracking direction;

the control device comprises:

an amplifying unit operable to change a gain balance by amplifying the first and the second detection signals using independent gains respectively;

an addition unit operable to output an addition signal by adding the first detection signal to the second detection signal in response to the shift in lens position of the convergence lens and the change in gain balance by the lens shifting unit and the amplifying unit; and a lens position adjustment unit operable to obtain the addition signal outputted from the addition unit, specify a lens position that equalizes the sizes of respective light receiving areas of the detection portions in the light detection device based on the obtained result, and control the lens shifting unit so that the convergence lens shifts to the determined lens position.

30. The control device according to claim 29, wherein the lens position adjustment unit specifies the determined lens position as a lens position that equalizes the sizes of the respective light receiving areas of the detection portions in the light detection device in the case where the addition signal becomes constant when the gain balance changes at the determined lens position.

31. The control method according to claim 28, further comprising:

a gain balance rechanging step of rechanging the gain balance by amplifying the first and the second detection signals using independent gains respectively based on the gains on the respective first and second detection signals in the gain balance adjusted in the gain balance adjustment step;

a lens position rechanging step of changing light receiving area in the light detection device in the tracking direction by reshifting the convergence lens in the tracking direction;

an addition signal reoutputting step of outputting the addition signal by adding the first detection signal to the second detection signal in response to the shift in lens position of the convergence lens and the change in gain balance in the gain balance rechanging step and the lens position rechanging step; and a lens position adjustment step of shifting the convergence lens to the determined lens position by specifying the lens position that equalizes sizes of the respective light receiving areas of the detection portions in the light detection device based on the addition result outputted in the addition signal reoutputting step.

32. The control method according to claim 28, further comprising:

a lens position adjustment step of shifting the convergence lens to the determined lens position by specifying the lens position that equalizes sizes of the respective light receiving areas of the detection portions in the light detection device based on the addition signal outputted in the addition signal outputting step.

* * * * *